(12) United States Patent
Min et al.

(10) Patent No.: US 12,309,719 B2
(45) Date of Patent: May 20, 2025

(54) ELECTRONIC DEVICE AND METHOD FOR ADJUSTING WIRELESS TRANSMIT POWER

(71) Applicant: Samsung Electronics Co., Ltd., Suwon-si (KR)

(72) Inventors: Hyunkee Min, Suwon-si (KR); Doosuk Kang, Suwon-si (KR); Jihoon Sung, Suwon-si (KR); Sunkee Lee, Suwon-si (KR); Junghun Lee, Suwon-si (KR); Junsu Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 365 days.

(21) Appl. No.: 17/861,346

(22) Filed: Jul. 11, 2022

(65) Prior Publication Data

US 2022/0394635 A1    Dec. 8, 2022

Related U.S. Application Data

(63) Continuation of application No. PCT/KR2021/010088, filed on Aug. 2, 2021.

(30) Foreign Application Priority Data

Jul. 31, 2020    (KR) .................. 10-2020-0096405

(51) Int. Cl.
*H04W 52/38* (2009.01)
*H04B 1/38* (2015.01)
(Continued)

(52) U.S. Cl.
CPC ......... *H04W 52/383* (2013.01); *H04W 52/22* (2013.01); *H04W 52/242* (2013.01)

(58) Field of Classification Search
None
See application file for complete search history.

(56) References Cited

U.S. PATENT DOCUMENTS 8,548,515 B2 * 10/2013 Celebi .................. H04W 52/50
                                                               455/67.11
9,713,087 B2 *  7/2017 Asterjadhi ........ H04W 28/0221
(Continued)

FOREIGN PATENT DOCUMENTS

CN        108781412 A     11/2018
CN        110492913 A     11/2019
(Continued)

OTHER PUBLICATIONS

Extended European Search Report dated Nov. 16, 2023 for EP Application No. 21849586.9.
(Continued)

*Primary Examiner* — Tuan A Tran
(74) *Attorney, Agent, or Firm* — Nixon & Vanderhye P.C.

(57) ABSTRACT

According to various embodiments of the disclosure, an electronic device includes: a display, a communication circuit, a memory storing instructions; and at least one processor operatively connected with the display, the communication circuit, and the memory, and when the stored instructions are executed, the at least one processor is configured to: control the electronic device to perform wireless connection with an external device using the communication circuit, performs a target wake time (TWT) setup including a TWT, a TWT duration, and a target wake interval with the external device, control the electronic device to transmit a first signal to the external device within the TWT duration, control the electronic device to receive a second signal from the external device within the TWT duration, determine an adjustment transmit power based on the first signal and the second signal, and control the electronic device to transmit data using the adjustment transmit power.

20 Claims, 17 Drawing Sheets

(51) Int. Cl.
*H04W 52/22* (2009.01)
*H04W 52/24* (2009.01)

(56) References Cited

U.S. PATENT DOCUMENTS

| | | | | |
|---|---|---|---|---|
| 10,194,391 | B2* | 1/2019 | Asterjadhi | H04W 52/0216 |
| 10,477,576 | B2* | 11/2019 | Lou | H04W 74/08 |
| 10,499,333 | B2* | 12/2019 | Asterjadhi | H04W 52/0235 |
| 10,827,425 | B2* | 11/2020 | Asterjadhi | H04W 72/30 |
| 10,973,051 | B2* | 4/2021 | Lou | H04W 74/0816 |
| 11,234,267 | B2* | 1/2022 | Lou | H04W 72/121 |
| 11,758,584 | B2* | 9/2023 | Lou | H04W 74/0816 370/445 |
| 11,792,846 | B2* | 10/2023 | Lou | H04W 74/08 370/329 |
| 2016/0119881 | A1* | 4/2016 | Merlin | H04W 52/54 370/328 |
| 2017/0195954 | A1 | 7/2017 | Ghosh | |
| 2017/0265130 | A1 | 9/2017 | Kakani | |
| 2018/0302930 | A1 | 10/2018 | Wang et al. | |
| 2018/0317262 | A1 | 11/2018 | Yang et al. | |
| 2019/0045438 | A1 | 2/2019 | Cariou et al. | |
| 2019/0053155 | A1 | 2/2019 | Kneckt et al. | |
| 2019/0373592 | A1 | 12/2019 | Ji et al. | |
| 2020/0169841 | A1 | 5/2020 | Das et al. | |
| 2020/0213160 | A1 | 7/2020 | Doostnejad et al. | |

FOREIGN PATENT DOCUMENTS

| | | |
|---|---|---|
| EP | 3 528 546 A1 | 8/2019 |
| KR | 10-2018-0086414 | 7/2018 |
| KR | 10-2019-0070970 | 6/2019 |
| KR | 10-2020-0028208 A | 3/2020 |
| KR | 10-2022-0017067 | 2/2022 |
| WO | 2014/126354 | 8/2014 |
| WO | 2016/069568 | 5/2016 |
| WO | WO 2016/069568 A1 | 5/2016 |
| WO | WO 2017/026807 A1 | 2/2017 |
| WO | WO 2017/070487 A1 | 4/2017 |

OTHER PUBLICATIONS

International Search Report for PCT/KR2021/010088 dated Nov. 26, 2021, 5 pages.
Written Opinion of the ISA for PCT/KR2021/010088 dated Nov. 26, 2021, 4 pages.
Chinese Office Action dated Mar. 25, 2025 for CN Application No. 202180057883.8.

* cited by examiner

ELECTRONIC DEVICE AND METHOD FOR ADJUSTING WIRELESS TRANSMIT POWER

CROSS-REFERENCE TO RELATED APPLICATIONS

This application is a continuation of International Application No. PCT/KR2021/010088, designating the United States, filed on Aug. 2, 2021 in the Korean Intellectual Property Receiving Office and claiming priority to Korean Patent Application No. 10-2020-0096405, filed on Jul. 31, 2020, in the Korean Intellectual Property Office, the disclosures of which are incorporated by reference herein in their entireties.

FIELD

The disclosure relates to an electronic device for adjusting a wireless transmit power and an operation method thereof.

DESCRIPTION OF RELATED ART

In recent years, devices for wirelessly connecting or wirelessly tethering connecting between an external device and an electronic device in a wireless communication system are developing. An electronic device may provide a connection network to a separate external device through wireless communication tethering. In this case, a power may be required to be adjusted in order to efficiently connect between the electronic device and the external device.

Recently, various services using augmented reality (AR) technology, which shows a three-dimensional virtual object of the real world by overlapping objects, are provided. Various types of wearable devices (for example, smart glasses or AR glasses) may provide AR experience to users through communication tethering with electronic devices (for example, smartphones or portable communication devices).

Since the wearable device should be worn on a user, a limit may be put to a battery capacity to achieve lightness of the device. In addition, reduction of electric current consumption may be required in order to provide a stable AR service to a user. For example, there may be a demand for technology for effectively controlling a wireless transmit power when an image and/or information is transmitted, in order to smoothly provide an AR experience to a user and to minimize power consumption.

SUMMARY

Based on the above-described discussion, various embodiments of the disclosure may provide an apparatus and a method for adjusting a wireless transmit power in a wireless communication system.

In addition, according to various embodiments of the disclosure, there may be provided an apparatus and a method by which an external device is wirelessly connected with an electronic device and transmits image information and/or sensor data in a wireless communication system.

In addition, according to various embodiments of the disclosure, the external device in the wireless communication system may receive an AR image which is processed using the camera image and/or the sensor information from the electronic device, and may provide an AR experience to a user.

Advantages achieved by the disclosure are not limited to those mentioned above, and other advantages that are not mentioned above may be clearly understood to those skilled in the art based on the description provided below.

According to various example embodiments of the disclosure, an electronic device may include: a display; a communication circuit; a memory configured to store instructions; and at least one processor operatively connected with the display, the communication circuit, and the memory. When the stored instructions are executed, the at least one processor may be configured to: control the electronic device to perform wireless connection with an external device using the communication circuit, perform a target wake time (TWT) setup including a TWT, a TWT duration, and a target wake interval with the external device, control the electronic device to transmit a first signal to the external device within the TWT duration, control the electronic device to receive a second signal from the external device within the TWT duration, determine an adjustment transmit power based on the first signal and the second signal, and control the electronic device to transmit data using the adjustment transmit power.

According to an example embodiment, an external device may include: a display; a communication circuit; a memory configured to store instructions; and at least one processor electrically connected with the display, the communication circuit, and the memory. When the stored instructions are executed, the at least one processor may be configured to: control the external device to perform wireless connection with an electronic device using the communication circuit, perform a TWT setup including a TWT, a TWT duration, and a target wake interval with the electronic device, control the external device to receive a first signal from the electronic device within the TWT duration, control the external device to transmit a second signal to the electronic device within the TWT duration, determine an adjustment transmit power based on the first signal and the second signal, and control the external device to transmit data using the adjustment transmit power.

According to an example embodiment, an example method of operating an electronic device may include: performing wireless connection with an external device; performing a TWT setup including a TWT, a TWT duration, and a target wake interval of the external device; transmitting a first signal to the external device within the TWT duration; receiving a second signal from the external device within the TWT duration; determining an adjustment transmit power based on the first signal and the second signal; and transmitting data using the adjustment transmit power.

The apparatus and the method according to various embodiments of the disclosure can reduce power consumption of devices by stably transmitting signals by controlling a wireless transmit power through signaling between the electronic device and the external device.

The effect achieved by the disclosure is not limited to those mentioned above, and other effects that are not mentioned above may be clearly understood to those skilled in the art based on the description provided above.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

An AR image may, for example, be implemented in an external device based on an image or information processed in an electronic device.

Hereinafter, various example embodiments of the disclosure will be described with reference to the accompanying drawings. However, it should be appreciated that various embodiments are not intended to limit the disclosure to particular embodiments and include various modifications, equivalents, and/or alternatives of embodiments of the disclosure.

Figure 1:
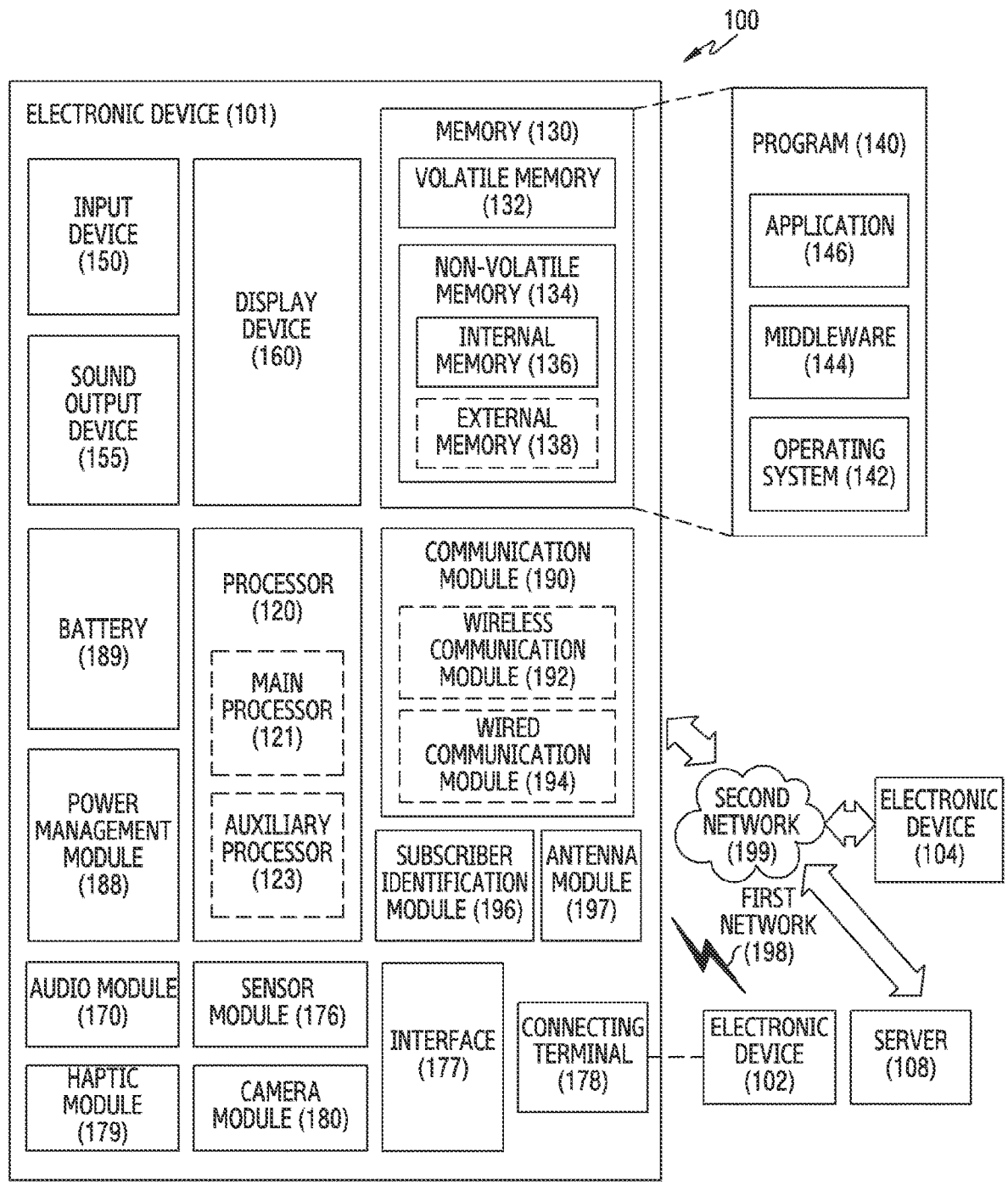
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann (RBM), a deep belief network (DBN), a bidirectional recurrent deep neural network (BRDNN), deep Q-network or a combination of two or more thereof but is not limited thereto. The artificial intelligence model may, additionally or alternatively, include machine a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same or similar type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
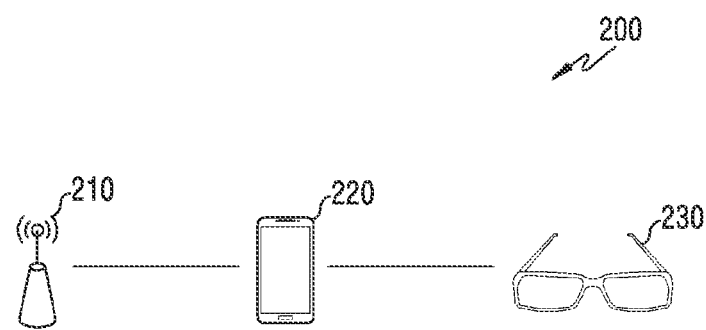
FIG. 2 is a diagram illustrating an example of a wireless communication environment including an electronic device according to various embodiments.

FIG. 2 is a diagram illustrating an example of a wireless communication system environment 200 according to various embodiments.

Referring to FIG. 2, the wireless communication system environment 200 according to an embodiment may include a cellular base station 210, an electronic device 220, an external device 230, or a combination of these.

The electronic device 220 of FIG. 2 may be an example of the electronic device 101 of FIG. 1. The external device 230 may be an example of the electronic device 102 of FIG. 1.

In an embodiment, the first electronic device 210 may include a device that connects the electronic device 220 and the external device 230, and may include, for example, a cellular base station or a WiFi router. The first electronic device 210 may include a network infrastructure which provides wireless access to the electronic device 220. The first electronic device 210 may have a coverage which may refer, for example, to a predetermined geographical region, based on a distance to which a signal can be transmitted. The first electronic device 210 may perform wireless connection between the electronic device and an external server using a WiFi network or a cellular network based on a type of a network.

In an embodiment, when the electronic device 220 is connected with an external server using, for example, a WiFi network, the first electronic device 210 may be referred to, for example, as an 'access point (AP)', a 'wireless point', a 'WiFi router', or other terms having the same or similar technical meaning as the above-described terms.

In an embodiment, when the electronic device 220 is connected with an external server using a cellular network, the first electronic device 210 may be referred to, for example, as a 'cellular base station', an 'eNodeB (eNB)', a '5th generation (5G) node', a 'next generation NodeB (gNB)', a '5G NodeB (5gNB)', a transmission/reception point (TRP)', a 'digital unit (DU)', a 'radio unit (RU)', a 'remote radio head (RRH)', or other terms having the same or similar technical meaning as the above-described terms.

In an embodiment, the electronic device 220 may include a device that is used by a user, and may perform communication with the cellular base station 210 through a wireless channel. According to circumstances, the electronic device 220 may operate without user's intervention. For example, the electronic device 220 may be a device that performs machine type communication (MTC), and may not be carried by a user. The electronic device 220 may be referred to, for example, as 'user equipment (UE)', a 'mobile station', a 'subscriber station', a 'remote terminal', a 'wireless terminal', an 'electronic device', or a 'user device', or other terms having the same or similar technical meaning as the above-mentioned terms, in addition to a terminal. The terminal (for example, the electronic device 220) according to various embodiments of the disclosure may include at least one of, for example, and without limitation, a cellular phone, a smartphone, a computer, a tablet PC, a mobile phone, a video phone, an electronic book reader, a desktop PC, a laptop PC, a netbook computer, a work station, a server, a personal digital assistant (PDA), a portable multimedia player (PMP), an MP3 player, a medical device, a camera, a wearable device, a multimedia system capable of performing a communication function, or the like. In addition, the types of terminals are not limited to the above-described examples. The electronic device has been described with reference to the electronic device 220, but the description is equally applicable to the external device 230.

In an embodiment, the external device 230 may include a device that is used by a user, and may perform communication with the electronic device 220 through a wireless channel. According to circumstances, the external device 230 may operate without user's intervention. For example, the external device 230 may be a device that performs MTC, and may not be carried by a user. The external device 230 may be a wearable device including a camera. The external device 230 may be worn by a user, and is not limited to a normal eyewear or sunglasses. For example, the external device 230 may indicate all wearable devices.

In an embodiment, the electronic device 220 may receive data from the external device 230. In an embodiment, the electronic device 220 may transmit data to the external device 230. In an embodiment, transmission and/or reception of data between the electronic device 220 and the external device 230 may be based on wireless communication. In an embodiment, the electronic device 220 may perform wireless connection based, for example, and without limitation, on WLAN standards regarding at least one band of the bands of 2.4 GHz, 5 GHz, 6 GHz, or 60 GHz.

In an embodiment, the electronic device 220 and the external device 230 may perform wireless connection using a WLAN. The external device 230 may transmit acquired image information and/or a variety of sensed information to the electronic device 220. The electronic device 220 may generate an image frame by processing the image information and/or the variety of sensed information, which is acquired from the external device 230. The external device 230 may receive the image frame from the electronic device 220 and may provide an AR image to a user.

In an embodiment, it may be assumed, without limitation, and for ease of illustration and explanation that a distance within which the electronic device 220 and the external device 230 are wirelessly connectable to each other is a few meters or less. For example, when a user uses the electronic device 220 in an outdoor space, the electronic device 220 may be in a user's pocket and the external device 230 may be used while being worn on user's face. In addition, the user may use the electronic device 220 and the external device 230 while moving. In this case, the electronic device 220 may be a mobile device including a smartphone.

In an embodiment, the electronic device 220 and the external device 230 may be connected with each other through short range communication. In an embodiment, the electronic device 220 may connect communication with an external server (for example, the server 108 of FIG. 1) through the cellular base station 210. For example, the electronic device 220 may transmit data which is based on image information and/or a variety of sensed information, which is acquired from the external device 230, to the external server. In an embodiment, the electronic device 220 may receive processed data from the external server, and may provide data which is based on the received data to the external device 230.

In an embodiment, when a user uses the electronic device 220 in an indoor space, the electronic device 220 may be located in a space such as, for example, and without limitation, a living room or on a table. For example, the user may go around in a house while wearing the external device 230 on its face. In this case, the external device 230 may operate in a place close to the electronic device 220 in the indoor space, or may operate at a long distance from the electronic device 220 in the indoor space. A wireless communication channel between the external device 230 and the electronic device 220 may be a time varying channel changing according to movement of the user, and may change quality of a signal.

In an embodiment, the electronic device 220 and the external device 230 may include devices supporting multiple-input and multiple-output (MIMO). When the electronic device 220 and the external device 230 use a transmit beamforming technique, transmit power control may be performed using a continuous CSI feedback. In addition, when the electronic device 220 and the external device 230 use the transmit beamforming technique, a method of obtaining a continuous CSI feedback may be scheduled and a method of controlling a transmit power according to scheduling may be provided.

In an embodiment, the electronic device 220 and the external device 230 may include devices supporting MIMO. When the electronic device 220 and the external device 230 do not use a transmit beamforming technique, transmit power control may be performed using a trigger frame, a power save (PS)-Poll frame (or a QoS null frame).

Figure 3:
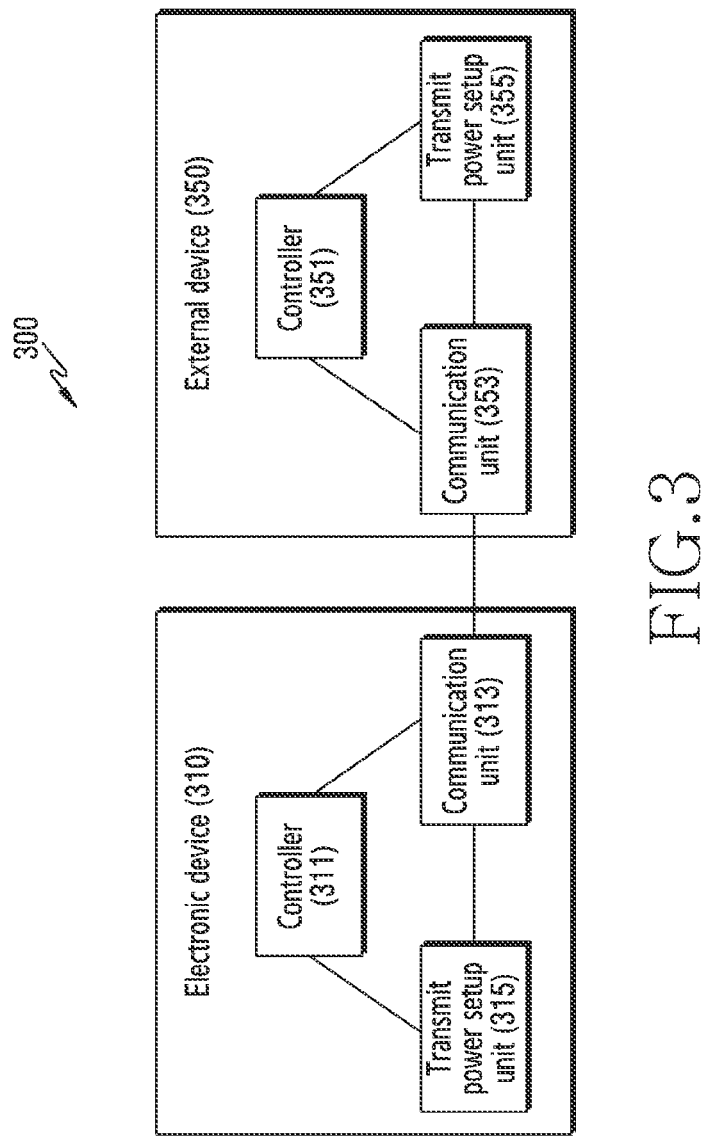
FIG. 3 is a block diagram illustrating example configurations of an electronic device and an external device according to various embodiments.

FIG. 3 is a block diagram 300 illustrating example configurations of an electronic device and an external device according to various embodiments. Referring to FIG. 3, the system block diagram 300 according to an embodiment may include an electronic device 310 and an external device 350. The electronic device 310 according to an embodiment may include a controller (e.g., including control circuitry) 311, a communication unit (e.g., including communication circuitry) 313, a transmit power setup unit (e.g., including various circuitry) 315, or a combination of these. The external device 350 according to an embodiment may include a controller (e.g., including control circuitry) 351, a communication unit (e.g., including communication circuitry) 353, a transmit power setup unit (e.g., including various circuitry) 355, or a combination of these. The electronic device 310 of FIG. 3 illustrates a non-limiting example of the electronic device 101. The external device 350 of FIG. 3 illustrates a non-limiting example of the electronic device 102 of FIG. 1.

In an embodiment, the controller 311 of the electronic device 310 may include various control circuitry including, for example, a controller of an application related to the external device 350 that is installed in the electronic device 310. The controller 311 may be electrically and/or operatively connected with the communication unit 313, the transmit power setup unit 315. When the electronic device 310 is connected with the external device 350 through wireless communication, the controller 311 may transmit information of a refresh rate and the number of bits per frame of the external device 350, which is received from the external device 350 through the communication unit 313, to the transmit power setup unit 315.

In an embodiment, the communication unit 313 of the electronic device 310 may include various communication circuitry including, for example, a WiFi module for performing wireless connection with the external device 350. The communication unit 313 may be electrically and/or operatively connected with the controller 311, the transmit power setup unit 315. The communication unit 313 may receive basic transmit power information from the transmit power setup unit 315. The communication unit 313 may receive a TWT-related frame or a CSI feedback from the communication unit 353 of the connected external device 350. The communication unit 313 may transmit the TWT-related frame or an NDPA frame (or a null data packet (NDP) frame) to the communication unit 353 of the connected external device 350. The communication unit 313 may transmit the basic transmit power information to the communication unit 353 of the external device. The communication unit 313 may transmit information acquired from the TWT-related frame or the CSI feedback to the communication unit 313 of the electronic device 310. The information acquired from the TWT-related frame or the CSI feedback may include signal quality information for each stream.

In an embodiment, the transmit power setup unit 315 of the electronic device 310 may include various circuitry, including, for example, a transmit power calculator. The transmit power setup unit 315 may be electrically and/or operatively connected with the controller 311 and/or the communication unit 313. When the electronic device 310 is connected with the external device 350 through wireless communication, the transmit power setup unit 315 may receive the information of the refresh rate and the number of bits per frame of the external device 350 from the controller 311. The transmit power setup unit 315 may transmit the basic transmit power information to the communication unit 313. The transmit power setup unit 315 may receive the information acquired from the TWT-related frame or the CSI feedback from the communication unit 313. The information acquired from the TWT-related frame or the CSI feedback may include signal quality information for each stream. The transmit power setup unit 315 may calculate a minimum required data rate for stable communication using the signal quality information for each stream. The transmit power setup unit 315 may calculate a power margin satisfying the minimum required data rate. The transmit power setup unit 315 may calculate a path loss using the basic transmit power and the signal quality information for each stream. The transmit power setup unit 315 may determine an adjustment transmit power based on the path loss and the power margin.

In an embodiment, the controller 351 of the external device 350 may include various control circuitry, including, for example, a controller of an application related to the external device 350 that is installed in the external device 350, or an image controller. The controller 351 may be electrically and/or operatively connected with the communication unit 353 and/or the transmit power setup unit 355. When the external device 350 is connected with the electronic device 310 through wireless communication, the controller 351 may transmit information of the number of bits per frame to the transmit power setup unit 355. For example, the number of bits per frame may be determined based on a condition that is required by an application or a service which is ongoing in the external device 350.

In an embodiment, the communication unit 353 of the external device 350 may include various communication circuitry including, for example, a WiFi module for wirelessly connecting with the electronic device 310. The communication unit 353 may be electrically and/or operatively connected with the controller 351 and/or the transmit power setup unit 355. The communication unit 353 may receive basic transmit power information from the transmit power setup unit 355. The communication unit 353 may receive a TWT-related frame or a CSI feedback from the communication unit 313 of the connected electronic device 310. The communication unit 353 may transmit a TWT-related frame or an NDPA frame (or an NDP frame) to the communication unit 313 of the connected electronic device 310. The communication unit 353 may transmit basic transmit power information of the external device 350 to the communication unit 313 of the electronic device. The communication unit 353 may transmit information acquired from the TWT-related frame or the CSI feedback to the transmit power setup unit 355. The information acquired from the TWT-related frame or the CSI feedback may include signal quality information for each stream.

In an embodiment, the transmit power setup unit 355 of the external device 350 may include various circuitry including, for example, a transmit power calculator. The transmit power setup unit 355 may be electrically and/or operatively connected with the controller 351 and/or the communication unit 353. When the external device 350 is connected with the electronic device 310 through wireless communication, the transmit power setup unit 355 may receive information of the number of bits per frame from the controller 351. The transmit power setup unit 355 may transmit the basic transmit power information to the communication unit 353. The transmit power setup unit 355 may receive the information acquired from the TWT-related frame or the CSI feedback from the communication unit 353. The information acquired from the TWT-related frame or the CSI feedback may include signal quality information for each stream. The transmit power setup unit 355 may calculate a minimum required data rate for stable communication, using the signal quality information for each stream. The transmit power setup unit 355 may calculate a power margin satisfying the minimum required data rate. The transmit power setup unit 355 may calculate a path loss using a basic transmit power and signal quality information for each stream. The transmit power setup unit 355 may determine an adjustment transmit power based on the path loss and the power margin.

According to an embodiment, the controller 311 of the electronic device 310 may correspond to the processor 120 of FIG. 1, the communication unit 313 may correspond to the communication module 190 of FIG. 1, and the transmit power setup unit 315 may correspond to the power management module 188. According to an embodiment, the controller 311, the communication unit 313, and/or the transmit power setup unit 315 explained in FIG. 3 may be integrated into one element, or may be implemented by a plurality of separate elements.

In an embodiment, an element into which the controller 311, the communication unit 313, and/or the transmit power setup unit 315 of the electronic device 310 is integrated may correspond to the processor 120 of the electronic device 310. In an embodiment, when the electronic device 310 is connected with the external device 350 through wireless communication, the processor 120 of the electronic device 310 may receive information of a refresh rate and bits per frame from the external device 350. In an embodiment, the processor 120 may include a WiFi module for wirelessly connecting with the external device 350. In an embodiment, the processor 120 may receive basic transmit power information from the external device 350. In an embodiment, the processor 120 may receive a TWT-related frame, downlink frame, or a CSI feedback from the external device 350. In an embodiment, the processor 120 may transmit a TWT-related frame or an NDPA frame (or an NDP frame) to the external device 350. In an embodiment, the processor 120 may transmit basic transmit power information to the external device. In an embodiment, the processor 120 of the electronic device 310 may include a transmit power calculator. In an embodiment, the processor 120 may determine an adjustment transmit power. In an embodiment, the processor 120 may determine the adjustment transmit power based on a path loss.

According to an embodiment, the controller 351 of the external device 350 may correspond to the processor 120 of FIG. 1, the communication unit 353 may correspond to the communication module 190 of FIG. 1, and the transmit power setup unit 355 may correspond to the power management module 188. According to an embodiment, the controller 351, the communication unit 353, and/or the transmit power setup unit 355 explained in FIG. 3 may be integrated into one element (for example, a single chip), or may be implemented by a plurality of separate elements (for example, a plurality of chips).

In an embodiment, an element into which the controller 351, the communication unit 353, and/or the transmit power setup unit 355 of the external device 350 is integrated may correspond to the processor 120 of the external device 350. In an embodiment, when the external device 350 is connected with the electronic device 310 through wireless communication, the processor 120 of the external device 350 may transmit information of the number of bits per frame to the electronic device 310. In an embodiment, the processor 120 may include a WiFi module for wirelessly connecting with the electronic device 310. In an embodiment, the processor 120 may receive basic transmit power information from the electronic device 310. In an embodiment, the processor 120 may receive a TWT-related frame or an NDPA frame (or an NDP frame) from(?) the electronic device 310. In an embodiment, the processor 120 may transmit a TWT-related frame, downlink data, or a CSI feedback to the electronic device 310. In an embodiment, the processor 120 of the external device 350 may include a transmit power calculator. The processor 120 may determine an adjustment transmit power. In an embodiment, the processor 120 may determine the adjustment transmit power based on a path loss.

Figure 4:
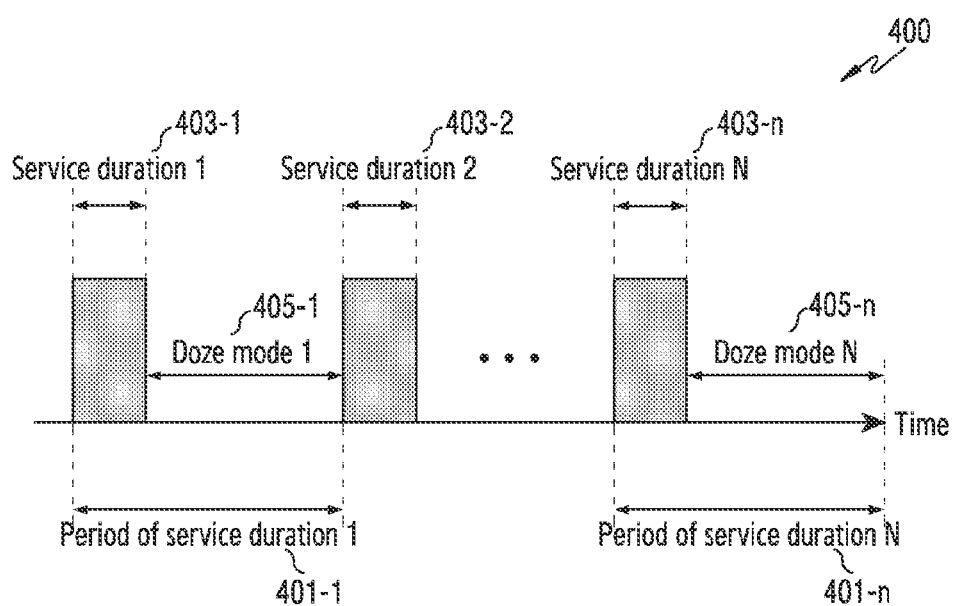
FIG. 4 is a diagram illustrating an example of scheduling between a service period and a service duration according to various embodiments.

FIG. 4 is a diagram illustrating an example 400 of scheduling a service duration and a period of a service duration according to various embodiments. FIG. 4 illustrates example operations of an electronic device and an external device. The electronic device of FIG. 4 illustrates a non-limiting example of the electronic device 101. The external device of FIG. 4 illustrates a non-limiting example of the electronic device 102 of FIG. 1.

Referring to FIG. 4, a service duration 403-1, 403-2, 403-*n* and a doze mode 405-1, 405-*n* duration may be repeated in every period of service duration 401-1, 401-*n*.

In an embodiment, the service duration 403-1, 403-2, or 403-*n* may refer, for example, to a duration for which the electronic device and the external device operate in a wake mode. The service duration 403-1, 403-2 or 403-*n* may refer, for example, to a duration for which wireless data communication is performed between the electronic device and the external device. The service duration 403-1, 403-2, or 403-*n* may be repeated in every period of service duration 401-1 or 401-*n*.

In an embodiment, the doze mode 405-1, 405-*n* duration may refer, for example, to a duration for which use of a network between the electronic device and the external device is limited to save battery consumption of the electronic device and the external device, and may refer, for example, to a duration for which wireless data communication is not performed between the electronic device and the external device. The doze mode 405-1, 405-*n* duration may be repeated in every period of service duration 401-1 or 401-*n*.

In an embodiment, when a refresh rate of the external device is 60 frames per second (fps), the period of the service duration may be calculated as 16.6 milliseconds (ms), and the service duration may be calculated as 2 ms. The electronic device may schedule a wake mode for wireless transmission and reception and a doze mode (for example, the doze mode 405-1 or 405-*n* duration), based on the period of the service duration and the service duration. The wake mode may correspond to the service duration 403-1, 403-2, or 403-*n*. The external device and the electronic device may operate in the wake mode for the service duration 403-1, 403-2 or 403-*n* to transmit and receive data to and from each other. The external device and the electronic device may enter the doze mode for the other duration than the service duration. The electronic device may schedule the wake mode and the doze mode. Through the scheduling, the electronic device may operate in the wake mode only for a necessary duration. Through the scheduling, the electronic device may operate in the doze mode in the other duration than the necessary duration, and may let a WLAN-related chip enter a sleep mode. By scheduling the wake mode and the doze mode, the electronic device can effectively reduce power consumption of the device.

As in the wireless communication environment of FIG. 2, the disclosure enables an electronic device and an external device in a wireless communication system to wirelessly connect using WLAN standards. The external device may transmit image information or sensing information acquired from a camera (for example, the camera module 180 of FIG. 1) of the external device to the electronic device using WLAN standards. The electronic device may process the image information or sensing information to provide an AR (or mixed reality (MR)) image using WLAN standards. There may be provided a method of determining a transmit power when the electronic device transmits processed image information to the external device. When the communication unit of the electronic device and the communication unit of the external device shown in FIG. 3 perform wireless connection, the electronic device may perform wireless connection based, for example, on WLAN standards regarding at least one band of bands of 2.4 GHz, 5 GHz, 6 GHz, or 60 GHz.

In addition, the disclosure provides a method of scheduling a service duration and a doze mode duration to effectively control a power as shown in FIG. 4. For example, based on a TWT protocol defined in the IEEE 802.11ah and 802.11ax, the electronic device may control a transmit power using a trigger frame and a PS-Poll frame (or a QoS null frame) within a TWT duration. Based on the TWT protocol defined in the IEEE 802.11ah and 802.11ax, the electronic device may control a transmit power using an NDPA frame (or an NDP frame) and a CSI feedback frame within a TWT duration.

Figure 5:
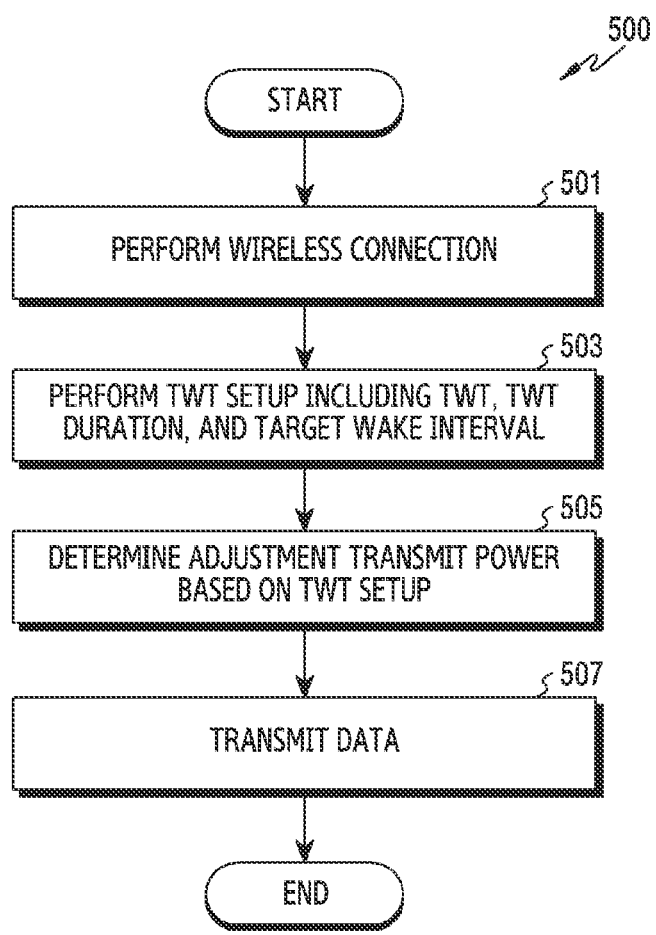
FIG. 5 is a flowchart illustrating an example operation of an electronic device for controlling a power according to various embodiments.

FIG. 5 is a flowchart 500 illustrating example operations of an electronic device for determining a transmit power in a wireless communication system according to various embodiments. The electronic device of FIG. 5 illustrates a non-limiting example of the electronic device 101. The external device of FIG. 5 illustrates a non-limiting example the electronic device 102 of FIG. 1.

Referring to FIG. 5, in operation 501, the electronic device according to an embodiment may perform wireless connection with the external device. The electronic device may detect the external device. In an embodiment, the electronic device may discover a connectable external device through out of band (OOB) communication (for example, Bluetooth low energy (BLE) or WiFi aware). The electronic device may perform wireless connection with the discovered external device.

According to an embodiment, in operation 503, the electronic device may perform a TWT setup including a TWT, a TWT duration, and a target wake interval.

The electronic device may perform the TWT setup using the service duration or the period of the service duration of FIG. 4. The electronic device may set the TWT to a time at which the service duration starts. The electronic device may set the TWT duration to a duration corresponding to the service duration (for example, the service duration 1 403-1, the service duration 2 403-2, the service duration N 403-n of FIG. 4). The electronic device may set the target wake interval to a period corresponding to the period of the service duration (for example, the period of service duration 1 401-1, the period of service duration N 401-n). For the TWT duration, the electronic device and the external device may operate in the wake mode. The electronic device may receive data from the external device or may transmit data to the external device for the TWT duration. The external device may receive data from the electronic device or may transmit data to the electronic device for the TWT duration.

According to an embodiment, in operation 505, the electronic device may determine an adjustment transmit power based on the TWT setup. The electronic device may determine the adjustment transmit power using a TWT-related signal received from the external device, based on the TWT setup.

According to an embodiment, the electronic device may calculate a path loss based on the TWT setup. The electronic device may calculate the path loss based on the result of receiving the TWT-related signal, based on the TWT setup. The electronic device may determine a transmit power based on the path loss. According to an embodiment, the electronic device may determine the adjustment transmit power by calculating the path loss based on a transmit power and a reception power of the TWT-related signal. According to an embodiment, the electronic device may determine the adjustment transmit power based on basic transmit power information and the result of receiving the TWT-related signal. According to an embodiment, the electronic device may determine the adjustment transmit power based on the result of receiving the TWT-related signal (for example, uplink data). According to an embodiment, the electronic device may determine the adjustment transmit power based on channel information (for example, a signal to noise ratio (SNR)) received from the external device.

According to an embodiment, the TWT-related signal may be a trigger frame and a PS-poll frame. According to an embodiment, the TWT-related signal may be a trigger frame and uplink data. According to an embodiment, the TWT-related signal may be an NDPA frame (or an NDP frame) and a CSI feedback frame.

According to an embodiment, the electronic device may determine the adjustment transmit power based on the TWT-related signal, which is based on the TWT setup, and the basic transmit power information. The basic transmit power information may include information regarding a power (hereinafter, a basic transmit power) of a signal that is transmitted from the electronic device to the external device and a signal that is transmitted from the external device to the electronic device.

According to an embodiment, in operation 507, the electronic device may transmit data to the external device. The electronic device may transmit data to the external device connected in operation 501. The electronic device may transmit data based on the adjustment transmit power determined in operation 505.

Although FIG. 5 illustrates example embodiments for the electronic device to perform the TWT setup and to determine the adjustment transmit power, embodiments of the disclosure are not limited thereto. The external device may also perform operations for performing the TWT setup and determining the adjustment transmit power. According to an embodiment, in the same or similar way as the electronic device, the external device may perform wireless connection with the electronic device, and may determine an adjustment transmit power based on a TWT setup. For example, the external device may determine the adjustment transmit power using a TWT-related signal received based on the TWT setup. In another example, the external device may calculate a path loss based on the result of receiving the TWT-related signal received based on the TWT setup. The external device may transmit data to the electronic device based on the determined adjustment transmit power.

Figure 6A:
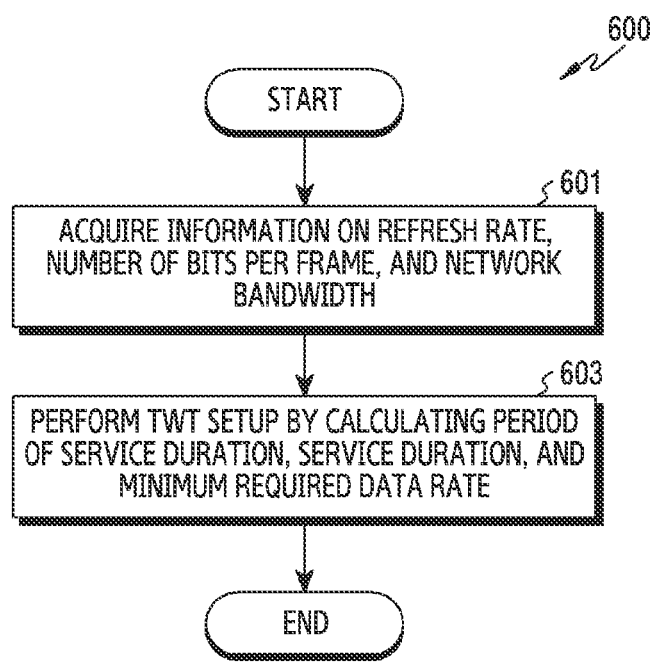
FIG. 6A is a flowchart illustrating example operations of an electronic device for a target wake time (TWT) setup according to various embodiments.

FIG. 6A is a flowchart 600 illustrating an example operation of an electronic device performing a TWT setup according to various embodiments. The electronic device of FIG. 6A illustrates a non-limiting example of the electronic device 101 of FIG. 1. The external device of FIG. 6A illustrates a non-limiting example of the electronic device 102 of FIG. 1.

Referring to FIG. 6A, in operation 601, the electronic device according to an embodiment may acquire information on a refresh rate, the number of bits per frame, and network bandwidth information. For example, the electronic device may acquire the information on the refresh rate and the number of bits per frame from the external device. In another example, the electronic device may acquire the information on the refresh rate and the number of bits per frame from an application related to the external device. The application related to the external device may be installed in the electronic device. In another example, the electronic device may acquire the information on the refresh rate and the number of bits per frame of the external device from a server (for example, the server 108 of FIG. 1). The electronic device may receive information on the external device (for example, the information on the refresh rate and the number of bits per frame) from the server before or after communication connecting with the external device. In an embodiment, the electronic device may acquire the network bandwidth information from a wireless local area network (WLAN) module (for example, the communication module 190 of FIG. 1).

According to an embodiment, in operation 603, the electronic device may perform a TWT setup by calculating a service duration, a period of a service duration, and a minimum required data rate. In an embodiment, the electronic device may determine a service period to perform the TWT setup. The electronic device may determine a service duration to perform the TWT setup. The electronic device may determine a minimum required date rate to perform the TWT setup. The minimum required data rate may refer, for example, to a minimum amount of data transmission required per unit time for stable communication. The electronic device may perform the TWT setup with the external device, based on the service period, the service duration and the minimum required data rate.

According to an embodiment, the electronic device may determine the service period based on a refresh rate. For example, when the refresh rate of the external device is 60 fps, the period of the service duration may be calculated as 16.6 ms. The electronic device and the external device may operate in a wake mode for every period of the service duration and may transmit and receive uplink and/or downlink data. When all necessary data are transmitted and received, the electronic device and the external device may enter a doze mode. The service duration may be determined to be a duration for which the electronic device and the external device should maintain the wake mode.

According to an embodiment, the electronic device may calculate the service duration based on the information on the number of bits per frame and the network bandwidth information, which are received in operation 601. The service duration may be determined based on an amount of data (for example, an amount of uplink data and/or an amount of downlink data) and a bandwidth. The service duration may be expressed by Equation 1 below:

$$\text{Service duration} = \{(\text{Amount of downlink data}) + (\text{Amount of uplink data})\}/(\text{Network bandwidth}) \quad \text{Equation 1}$$

The amount of downlink data may refer, for example, to an amount of data that is transmitted from the electronic device to the external device. The amount of uplink data may refer, for example, to an amount of data that is transmitted from the external device to the electronic device. An amount of data that is a sum of the amount of downlink data and the amount of uplink data may refer, for example, to the total amount of data that is transmitted and received between the electronic device and the external device for a corresponding duration. The network bandwidth may refer, for example, to a bandwidth of a channel through which the electronic device and the external device transmit and receive data to and from each other.

In an embodiment, the electronic device may have to operate in the wake mode for more than the service duration in order to achieve an amount of transmitted data per unit time that is required for communication with the external device. In addition, the electronic device may have to operate in the wake mode for more than the service duration in order to guarantee quality of a transmission signal. If, for example, the sum of the amount of uplink data transmitted from the external device to the electronic device and the amount of downlink data transmitted from the electronic device to the external device is 1.8 megabits (Mbits), and the network bandwidth is 1.8 giga bit per second (Gbps) in order to generate and transmit one AR image frame, the service duration may be calculated as 1 ms according to Equation 1. The electronic device may set the service duration to be longer than at least 1 ms to smoothly transmit data.

According to an embodiment, since there may be a network overload or an additional time may be required to retransmit in real wireless communication, the service duration may be set to be two times longer than a calculated minimum time (for example, 2 ms).

According to an embodiment, the minimum required data rate may be determined based on characteristics of wireless connection. The minimum required data rate may be based on characteristics of a physical layer of a currently connected WLAN. The minimum required data rate may be a value that is based on a modulation and coding scheme (MCS) of a signal. The MCS may be a space stream, a signal modulation form, a signal encoding rate, or a combination of these, and may refer, for example, to a variable for determining a data transmission speed.

In an embodiment, it may be assumed, by way of non-limiting example, that the electronic device and the external device perform wireless communication connection based on IEEE 802.11ax standards. In an embodiment, it may be assumed, by way of non-limiting example, that the electronic device and the external device support a 2×2 MIMO system and communicate with each other through a bandwidth of 160 megahertz (MHz). In this case, when the electronic device and the external device operate according to MCS11, a maximum amount of data transmitted per unit time may be calculated as 2.4 Gbps. In an embodiment, a data frame may be transmitted based on a transmission control protocol (TCP). In an embodiment, if efficiency of TCP communication is 75% of a physical layer link speed, the electronic device may determine a network bandwidth to be 1.8 Gbps (2.4 Gbps*0.75). In an embodiment, when an amount of data transmission of 1.8 Mbits is required per one frame, the electronic device may determine the service duration corresponding to a data transmission time to be 1 ms (1.8 Mbit/1.8 Gbps).

In an embodiment, the electronic device may determine the minimum required data rate as a specific MCS, based on the service duration and the amount of data transmission required per one frame. In an embodiment, the electronic device may set the service duration to be two times longer than a minimum time (for example, 2 ms) by considering a network overload or an additional transmission time required to retransmit. In an embodiment, when the amount of data transmission required per one frame is 1.8 Mbits, the electronic device may determine the network bandwidth to be larger than at least 900 Mbps (1.8 Mbits/2 ms). In an embodiment, if the network bandwidth is 75% of a physical layer link speed, the electronic device may determine a minimum transmission speed to be greater than 1200 Mbps (900 Mbps/0.75). The minimum transmission speed may refer, for example, to a minimum transmission speed for transmitting without a delay when a problem such as network congestion or retransmission does not occur in a wireless channel.

In an embodiment, the minimum required data rate may refer, for example, to a data rate at which a transmission speed 1.5 times higher than the minimum transmission speed is maintained and stable transmission is possible. In an embodiment, when the minimum transmission speed is 1200 Mbps, the electronic device may determine the minimum required data rate to be greater than 1800 Mbps. In an embodiment, the electronic device may determine the minimum required data rate according to specific MCS9. In an embodiment, the electronic device may calculate the maximum amount of data transmitted per unit time, which corresponds to MCS9, as 1.96 Gbps. In an embodiment, the minimum required data rate may correspond to the maximum amount of data transmitted per unit time (for example, 1.96 Gbps).

In an embodiment, the electronic device may perform a TWT setup based on the period of the service duration and the service duration which are calculated. The electronic device may determine a TWT based on a starting time of the service duration. The electronic device may determine a sustaining time of the service duration as a TWT sustaining time. The electronic device may determine the period of the service duration as a target wake interval.

The electronic device may transmit the TWT setup to the external device although this operation is not illustrated in FIG. 6A. The electronic device may transmit the TWT setup including the TWT, the TWT duration, and the target wake interval to the external device.

Although FIG. 6A illustrates that the electronic device performs the TWT setup, embodiments of the disclosure are not limited thereto. According to an embodiment, the external device may perform a TWT setup. For example, the external device may perform the TWT setup with the electronic device, based on a period of a service duration and a service duration which are calculated.

Figure 6B:
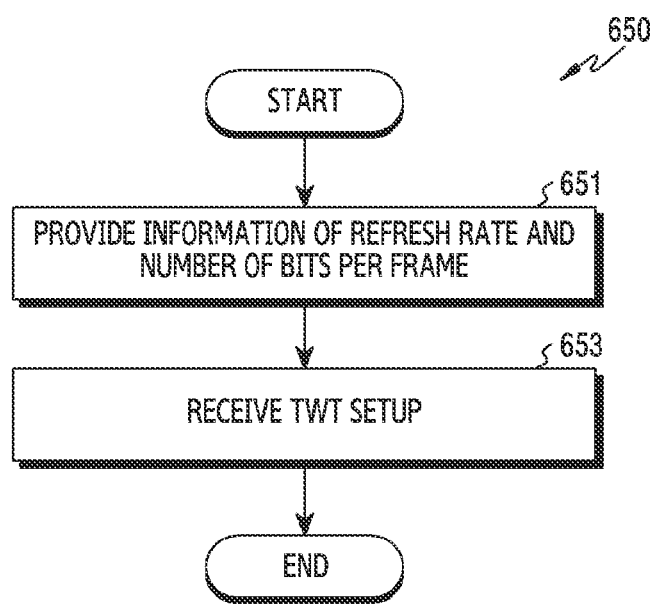
FIG. 6B is a flowchart illustrating example operations of an external device for a TWT setup according to various embodiments.

FIG. 6B is a flowchart 650 illustrating an example operation of an external device which performs a TWT setup according to various embodiments. The electronic device of FIG. 6B illustrates a non-limiting example of the electronic device 101. The external device of FIG. 6B illustrates a non-limiting example of the electronic device 102 of FIG. 1.

Referring to FIG. 6B, in operation 651, the external device may provide information on a refresh rate and the number of bits per frame to the electronic device. The external device may transmit the information on the refresh rate of the external device, and the number of bits per frame in a transmission and reception link to the electronic device. In addition, the external device may transmit the information on the refresh rate of the external device, the number of bits per frame in the transmission and reception link to the electronic device, through an application related to the external device, which is installed in the electronic device.

According to an embodiment, in operation 653, the external device may receive a TWT setup from the electronic device. In an embodiment, the external device may receive TWT setup information including a TWT, a TWT duration, a target wake interval, which is set by the electronic device, from the electronic device. The external device may identify the TWT setup.

Although FIG. 6B illustrates that the external device receives the TWT setup, embodiments of the disclosure are not limited thereto. When the external device performs a TWT setup based on a period of a service duration and a service duration, the electronic device may receive the TWT setup from the external device.

Figure 7:
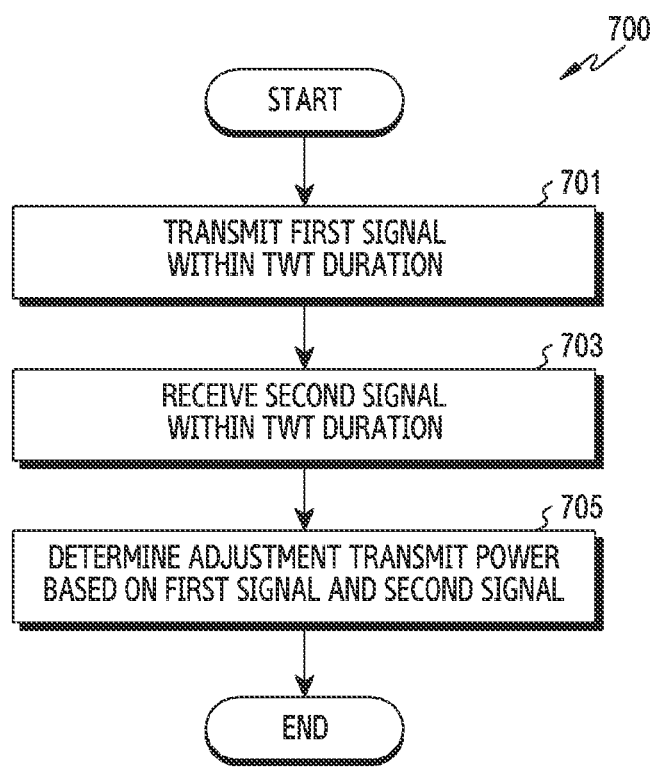
FIG. 7 is a flowchart illustrating example operations of an electronic device for determining a transmit power according to various embodiments.

FIG. 7 is a flowchart 700 illustrating an example operation of an electronic device which determines a transmit power according to various embodiments. The electronic device of FIG. 7 illustrates a non-limiting example of the electronic device 101. The external device of FIG. 7 illustrates a non-limiting example of the electronic device 102 of FIG. 1.

Although not shown in FIG. 7, a TWT request or a TWT response frame may include a trigger sub field and a flow type sub field according to an embodiment. An adjustment transmit power determination method of the electronic device may be set through the trigger sub field and the flow type sub field. For example, when the trigger sub field value is 1, the electronic device may transmit a trigger frame. In addition, the external device may transmit data only in response to the trigger frame. When the flow type sub field value is 0, the external device may inform the electronic device of a wake mode through a PS-poll frame (or a QoS null frame). When the trigger sub field value is 0, the electronic device may not transmit the trigger frame. When the flow type sub field value is 1, the external device may not transmit the PS-poll frame (or QoS null frame).

Referring to FIG. 7, in operation 701, the electronic device according to an embodiment may transmit a first signal to the external device within a TWT duration. According to an embodiment, the first signal may include a trigger frame. According to an embodiment, the first signal may include an NDPA frame (or an NDP frame).

According to an embodiment, in operation 703, the electronic device may receive a second signal from the external device within the TWT duration. According to an embodiment, the second signal may include a PS-poll frame (or a QoS null frame). According to an embodiment, the second signal may include an uplink data (or downlink data) signal. According to an embodiment, the second signal may include a CSI feedback.

According to an embodiment, in operation 705, the electronic device may determine a transmit power based on the first signal and the second signal. The electronic device may transmit the first signal for determining an adjustment transmit power to the external device after a TWT setup. The electronic device may receive the second signal for determining the adjustment transmit power from the external device after the TWT setup.

According to an embodiment, the electronic device may calculate a path loss based on the first signal and the second signal. The electronic device may determine the adjustment transmit power based on the path loss. For example, the first signal may include a trigger frame and an NDPA frame (or an NDP frame) and downlink data. For example, the second signal may include a PS-poll frame (or a QoS null frame), uplink data, and a CSI feedback frame.

According to an embodiment, the electronic device may calculate a target received signal strength indicator (RSSI) based on a minimum required data rate. The electronic device may determine the adjustment transmit power based on the target RSSI and the path loss. For example, the electronic device may calculate the adjustment transmit power by summing up the target RSSI and the path loss.

According to an embodiment, the electronic device may determine the adjustment transmit power based on the trigger frame which is the first signal and a first PS-poll frame which is the second signal. The electronic device may receive the PS-poll frame from the external device in response to transmission of the trigger frame of the electronic device. The electronic device may calculate the path loss based on basic transmit power and the result of receiving the PS-poll frame. The electronic device may determine the adjustment transmit power based on the path loss. The external device may receive the trigger frame which is the first signal from the electronic device. The external device may calculate the path loss based on basic transmit power information and the result of receiving the trigger frame. The external device may determine a transmit power based on the path loss.

According to an embodiment, the external device may determine the transmit power based on the trigger signal which is the first signal and the uplink data which is the second signal. The external device may receive the trigger frame from the electronic device. The external device may calculate the path loss, based on an access point (AP) transmit power of the electronic device and a reception power of the trigger frame. The external device may determine the transmit power based on the path loss. According to an embodiment, the external device may transmit uplink data including the determined adjustment transmit power value to the electronic device. The electronic device may identify an adjustment transmit power value included in the uplink data received from the external device. The electronic device may determine the adjustment transmit power of the electronic device, based on the identified adjustment transmit power value. The electronic device may transmit a signal using the determined adjustment transmit power.

According to an embodiment, the electronic device may determine a transmit power based on the NDPA frame (or NDP frame) and the CSI feedback frame which is the second signal. In response to transmission of the NDPA frame (or NDP frame) of the electronic device, the electronic device may receive the CSI feedback frame from the external device. The electronic device may calculate the path loss based on signal quality (for example, an SNR) of the CSI feedback frame. The electronic device may determine the transmit power based on the path loss.

According to an embodiment, in response to transmission of the NDPA (or NDP frame) of the external device, the external device may receive the CSI feedback frame from the electronic device. The external device may calculate the path loss based signal quality (for example, an SNR) of the CSI feedback frame. The external device may determine the transmit power based on the path loss.

According to an embodiment, the electronic device may determine the adjustment transmit power based on basic transmit power information. The basic transmit power information may include information regarding a power (hereinafter, a basic transmit power) of a signal that is transmitted from the electronic device to the external device, and a signal that is transmitted from the external device to the electronic device.

Figure 8A:
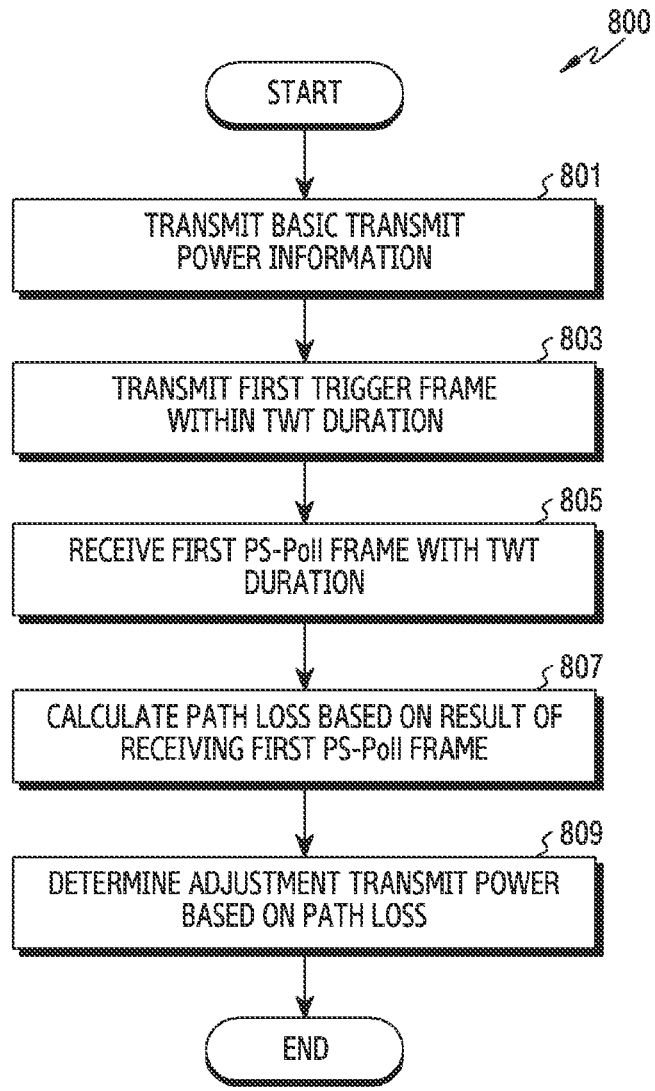
FIG. 8A is a flowchart illustrating example operations of an electronic device for determining an adjustment transmit power based on basic transmit power information according to various embodiments.

FIG. 8A is a flowchart 800 illustrating example operation of an electronic device for determining an adjustment transmit power based on basic transmit power information according to an embodiment. The electronic device of FIG. 8A illustrates a non-limiting example of the electronic device 101. The external device of FIG. 8A illustrates a non-limiting example of the electronic device 102 of FIG. 1.

In FIG. 8A, operations of the electronic device for transmitting basic transmit power information using a TWT frame will be described.

Referring to FIG. 8A, in operation 801, the electronic device according to an embodiment may transmit basic transmit power information. The basic transmit power information may include information regarding a power of a signal that is transmitted from the electronic device to the external device and a signal that is transmitted from the external device to the electronic device. The electronic device may transmit the basic transmit power information to the external device. The external device may identify a value of a basic transmit power that is allocated to a signal from the received basic transmit power information.

According to an embodiment, in operation 803, the electronic device may transmit a first trigger frame to the external device within a TWT duration. According to an embodiment, the electronic device may transmit the first trigger frame to the external device within a first TWT duration. For example, the electronic device may transmit the first trigger frame to the external device, based on the basic transmit power. The first trigger frame may be transmitted by the basic transmit power, and accordingly, a downlink path loss may be determined by the external device. The external device may determine an uplink transmit power based on a downlink path loss.

According to an embodiment, in operation 805, the electronic device may receive a first PS-poll frame from the external device within the TWT duration. According to an embodiment, the electronic device may receive the first PS-poll frame from the external device within the first TWT duration. The first PS-poll frame may be transmitted by the external device based on a basic transmit power value included in the basic transmit power information. The electronic device may acquire a result of receiving by measuring the first PS-poll frame. The result of receiving may include signal quality of the first PS-poll frame.

According to an embodiment, in operation 807, the electronic device may calculate a path loss based on the result of receiving the first PS-poll frame. The electronic device may measure an uplink reception power by receiving the first PS-poll frame. The electronic device may calculate an uplink path loss value by comparing the basic transmit power and the uplink reception power. The electronic device may determine a difference between the basic transmit power and the uplink reception power as an uplink path loss.

According to an embodiment, in operation 809, the electronic device may determine an adjustment transmit power based on the path loss. The electronic device may determine a downlink path loss based on the uplink path loss which is calculated in operation 807. The electronic device may determine the adjustment transmit power of the electronic device, based on a target reception power of the external device and the path loss. For example, the target reception power may include a receiver minimum input level sensitivity for guaranteeing an MCS selected by the electronic device and/or the external device. The receiver minimum input level sensitivity may be defined in IEEE 802.11 standards, and may be set differently according to the MCS. In an embodiment, the adjustment transmit power which is determined based on the target reception power of the external device and the path loss may be lower than the basic transmit power. The electronic device may transmit data using the adjustment transmit power. The electronic device can reduce power consumption of the electronic device by transmitting data to the external device using the adjustment transmit power which is determined to be lower than the basic transmit power based on the path loss.

Although FIG. 8A illustrates that the electronic device transmits the first trigger frame and receives the first PS-poll frame, embodiments of the disclosure are not limited thereto.

According to an embodiment, the external device may transmit the first trigger frame to the electronic device and the electronic device may transmit the first PS-poll frame to the external device, and accordingly, the external device may calculate the path loss and may calculate the adjustment transmit power.

Figure 8B:
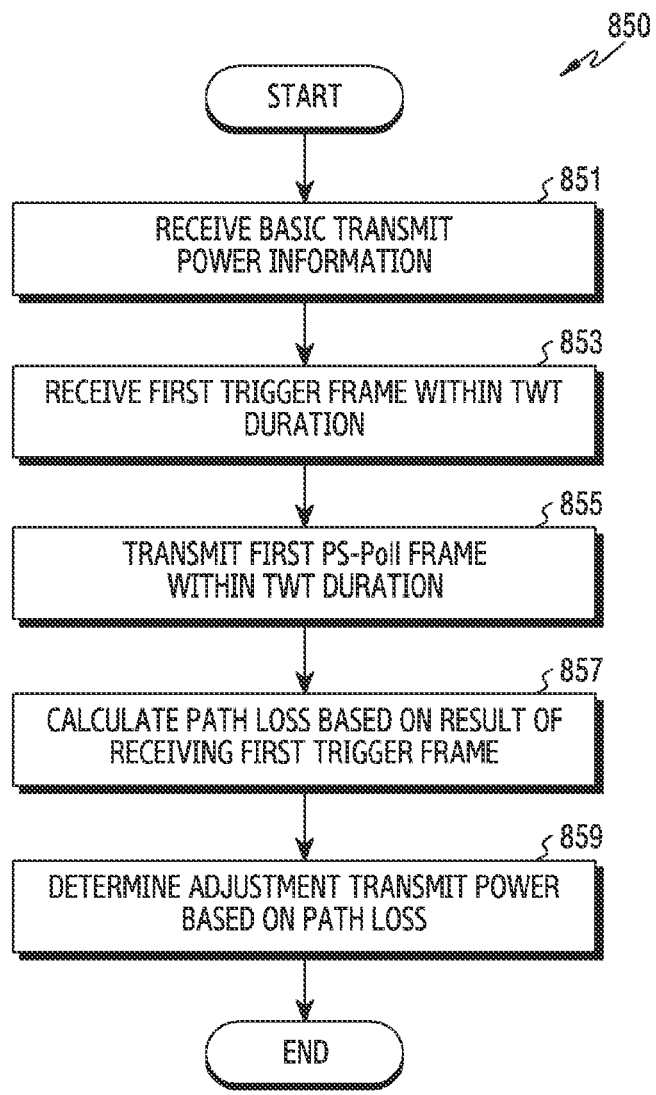
FIG. 8B is a flowchart illustrating an example operation of an external device for determining an adjustment transmit power based on basic transmit power information according to various embodiments.

FIG. 8B is a flowchart 850 illustrating example operation of an external device for determining an adjustment transmit power based on basic transmit power information according to various embodiments. The electronic device of FIG. 8B illustrates a non-limiting example of the electronic device 101. The external device of FIG. 8B illustrates a non-limiting example of the electronic device 102 of FIG. 1. In FIG. 8B, operations of the external device for receiving basic transmit power information using a TWT frame will be described.

Referring to FIG. 8B, in operation 851, the external device according to an embodiment may receive basic transmit power information from the electronic device. The basic transmit power information may include information regarding a power (hereinafter, a basic transmit power) of a signal that is transmitted from the electronic device to the external device and a signal that is transmitted from the external device to the electronic device. The external device may identify a value of a basic transmit power that is allocated to a signal from the received basic transmit power information.

According to an embodiment, in operation 853, the external device may receive a first trigger frame from the electronic device within a TWT duration. According to an embodiment, the external device may receive the first trigger frame from the electronic device within a first TWT duration. The external device may receive the first trigger frame from the electronic device, based on the basic transmit power. The first trigger frame may be transmitted by the basic transmit power, and accordingly, a downlink path loss may be determined by the external device. A transmit power may be determined in the external device based on a downlink path loss.

According to an embodiment, in operation 855, the external device may transmit a first PS-poll frame to the electronic device within the TWT duration. According to an embodiment, the external device may transmit the first PS-poll frame to the electronic device within the first TWT duration. The first PS-poll frame may be transmitted by the external device, based on a basic transmit power value included in the basic transmit power information. A result of receiving the first PS-poll frame may be acquired by being measured by the electronic device. The result of receiving the first PS-poll frame may include signal quality of the first PS-poll frame.

According to an embodiment, in operation 857, the external device may calculate a path loss based on the result of receiving the first trigger frame. The external device may measure a downlink reception power by receiving the first trigger frame. The external device may calculate a downlink path loss value by comparing the basic transmit power and the downlink reception power. For example, the external device may determine a difference between the basic transmit power and the downlink reception power as the downlink path loss.

According to an embodiment, in operation 859, the external device may determine an adjustment transmit power based on the path loss. The external device may determine an uplink path loss based on the downlink path loss calculated in operation 857. The external device may determine an adjustment transmit power of the external device, based on a target reception power of the electronic device and the path loss. For example, the target reception power may include a receiver minimum input level sensitivity for guaranteeing an MCS selected by the electronic device and/or the external device. The receiver minimum input level sensitivity may be defined by IEEE 802.11 standards and may be set differently according to the MCS. In an embodiment, the adjustment transmit power which is determined based on the target reception power of the external device and the path loss may be lower than the basic transmit power.

The external device may transmit data using the adjustment transmit power. The external device can reduce power consumption of the external device by transmitting data to the electronic device using the adjustment transmit power which is determined to be lower than the basic transmit power.

Although FIG. 8B illustrates that the external device transmits the first PS-poll frame and receives the first trigger frame, embodiments of the disclosure are not limited thereto.

According to an embodiment, the electronic device may transmit the first PS-poll frame to the external device, and the external device may transmit the first trigger frame to the electronic device, and accordingly, the electronic device may calculate the path loss and may calculate the adjustment transmit power.

According to an embodiment, the electronic device may transmit basic transmit power information for transmitting and receiving data to the external device. For example, the electronic device may transmit basic transmit power information including a basic transmit power P1 to the external device. The external device may determine a difference between the basic transmit power P1 and a reception power P1_trigger of the first trigger frame as a downlink path loss L1. The electronic device may determine a difference between the basic transmit power P1 and a reception power P1_ps_poll of the first PS-poll frame as an uplink path loss L2.

According to an embodiment, the electronic device may determine the adjustment transmit power based on a target RSSI. The external device may determine the adjustment transmit power, based on the target RSSI. For example, if a minimum required data rate for transmitting and receiving all given data within a TWT duration is determined according to MCS9 of 11ax standards, the target RSSI may be determined based on a receiver minimum input level sensitivity. The receiver minimum input level sensitivity may refer to a designated minimum radio frequency (RF) level of a WLAN signal that a WLAN receiver (for example, the electronic device and/or the external device) will receive and demodulate while maintaining a frame error rate (FER) or a packet error rate (PER) below specific specifications.

Table 1 is a table regarding the receiver minimum input level sensitivity. For example, if a minimum required data rate is MCS9 of 11ax standards when a bandwidth of 160 MHz is used, the receiver minimum input level sensitivity value is −48 dBm.

TABLE 1

| Modulation Without DCM | Modulation With DCM | Rate (R) | Minimum sensitivity (20 MHz PPDU) (dBm) | Minimum sensitivity (40 MHz PPDU) (dBm) | Minimum sensitivity (80 MHz PPDU) (dBm) | Minimum sensitivity (160 MHz or 80 + 80 MHz PPDU) (dBm) | |
|---|---|---|---|---|---|---|---|
| N/A | BPSK | 1/2 | −82 | −79 | −76 | −73 | |
| BPSK | QPSK | 1/2 | −82 | −79 | −76 | −73 | |
| QPSK | 16-QAM | 1/2 | −79 | −76 | −73 | −70 | |
| QPSK | 16-QAM | 3/4 | −77 | −74 | −71 | −68 | |
| 16-QAM | N/A | 1/2 | −74 | −71 | −68 | −65 | |
| 16-QAM | N/A | 3/4 | −70 | −67 | −64 | −61 | |
| 64-QAM | N/A | 2/3 | −66 | −63 | −60 | −57 | |
| 64-QAM | N/A | 3/4 | −65 | −62 | −59 | −56 | |
| 64-QAM | N/A | 5/6 | −64 | −61 | −58 | −55 | |
| 256-QAM | N/A | 3/4 | −59 | −56 | −53 | −50 | |
| 256-QAM | N/A | 5/6 | −57 | −54 | −51 | −48 | MCS9 |
| 1024-QAM | N/A | 3/4 | −54 | −51 | −48 | −45 | |
| 1024-QAM | N/A | 5/6 | −52 | −49 | −46 | −43 | |

According to an embodiment, the target RSSI may be determined by a sum of the receiver minimum input level sensitivity and a margin (a). The external device may determine the sum of the target RSSI and the margin (a) as the adjustment transmit power. The electronic device may determine the sum of the target RSSI and the margin ($a$) as the adjustment transmit power.

$$P\_new\_external\ device = \text{Receiver minimum input level sensitivity} + \alpha + L1 \quad \text{Equation 2}$$

P_new_external device may refer, for example, to a transmit power which is determined in the external device based on a target RSSI and a path loss. The receiver minimum input level sensitivity may refer to a designated minimum RF level of a WLAN signal that a receiver will receive or a WLAN signal that will be demodulated. The margin ($\alpha$) may refer, for example, to a margin regarding the receiver minimum input level sensitivity. The target RSSI may refer, for example, to a sum of the receiver minimum input level sensitivity and the margin ($\alpha$). L1 may refer, for example, to a path loss that occurs when a signal is transmitted from the electronic device to the external device. The external device may calculate an adjustment transmit power (P_new_external device) based on Equation 2.

$$P\_new\_electronic\ device = \text{Receiver minimum input level senstivity} + \alpha + L2 \quad \text{Equation 3}$$

P_new_electronic device may refer, for example, to a transmit power which is determined in the electronic device based on a target RSSI and a path loss. The receiver minimum input level sensitivity may refer to a designated minimum RF level of a WLAN signal that a receiver will receive or a WLAN signal that will be demodulated. The margin ($\alpha$) may refer, for example, to a margin regarding the receiver minimum input level sensitivity. The target RSSI may refer, for example, to a sum of the receiver minimum input level sensitivity and the margin ($\alpha$). L2 may refer, for example, to a path loss that occurs when a signal is transmitted from the external device to the electronic device. The electronic device may calculate an adjustment transmit power (P_new_electronic device) based on Equation 3.

Figure 9:
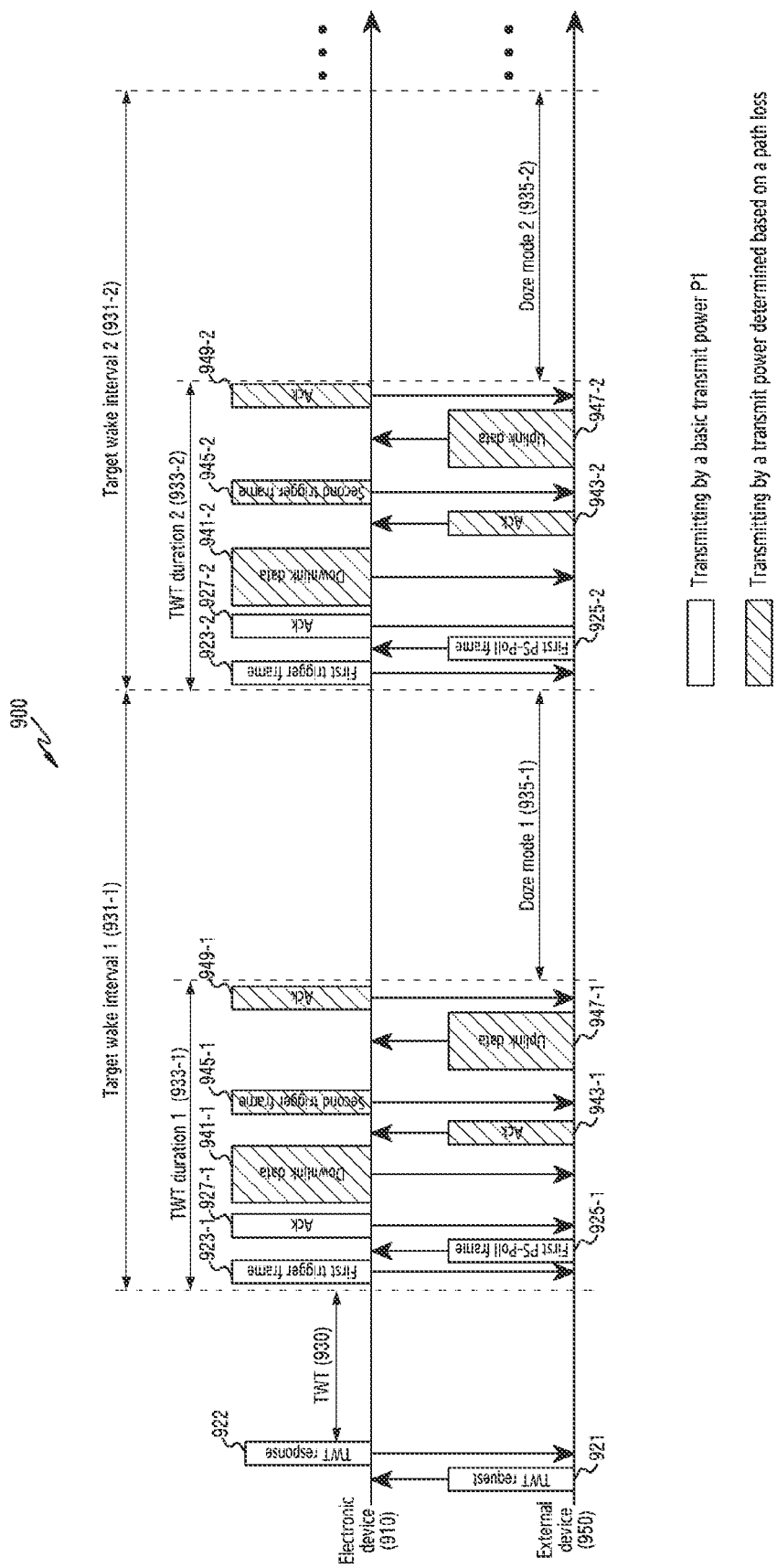
FIG. 9 is a diagram illustrating an example method for determining an adjustment transmit power based on basic transmit power information according to various embodiments.

FIG. 9 is a diagram 900 illustrating an example method for determining an adjustment transmit power based on basic transmit power information according to various embodiments. The electronic device 910 illustrates a non-limiting example of the electronic device 101. The external device 950 of FIG. 9 illustrates a non-limiting example of the electronic device 102 of FIG. 1.

Referring to FIG. 9, the external device 950 may transmit a TWT request frame 921 to the electronic device 910. The electronic device 910 may transmit a TWT response frame 922 to the external device in response to reception of the TWT request frame 921. The TWT request frame 921 may include at least one of a TWT 930, a target wake interval 931-1 or 931-2, a TWT duration 933-1 or 933-2, a trigger sub field and a flow type sub field. The TWT response frame 922 may include at least one of the TWT 930, the target wake interval 931-1 or 931-2, the TWT duration 933-1 or 933-2, the trigger sub field and the flow type sub field, as a response to the TWT request frame 921. Although FIG. 9 illustrates both the TWT request frame 921 and the TWT response frame 922, the electronic device 910 according to an embodiment may not receive the TWT request frame 921 and may transmit TWT setup information included in the TWT response frame 922 to the external device 950. Although FIG. 9 illustrates that a TWT setup is completed by the external device 950 transmitting the TWT request frame 921 and the electronic device 910 transmitting the TWT response frame 922, the TWT request frame 921 and the TWT response frame 922 may be transmitted multiple times according to an embodiment. For example, when the TWT 930, the target wake interval 931-1 or 931-2, or the TWT duration 933-1 or 933-2 set by the external device 950 and/or the electronic device 910 is different, the external device and/or the electronic device may complete the TWT setup through a plurality of TWT request frames 921 and a plurality of TWT response frames 922.

The TWT 930 may indicate a time at which the TWT duration 933-1 starts after the TWT setup. The target wake interval 931-1 or 931-2 may refer to a period during which the electronic device and the external device operate in a wake mode. The TWT duration 933-1 or 933-2 and a doze mode 935-1 or 935-2 may be repeated in every target wake interval 931-1 or 931-2. The electronic device 910 and the external device 950 may transmit and receive a signal within the TWT duration 933-1 or 933-2. The signal may include a first trigger frame 923-1 or 923-2, a first PS-poll frame 925-1 or 925-3, an Ack 927-1 or 927-2, downlink data 941-1 or 941-2, an ack 943-1 or 943-2, a second trigger frame 945-1 or 945-2, uplink data 947-1 or 947-2, an ack 949-1 or 949-2.

According to an embodiment, the electronic device 910 may transmit basic transmit power P1 information to the external device 950. According to an embodiment, the electronic device 910 may include the basic transmit power P1 information in the first trigger frame 923-1 or 923-2 and may transmit the same. According to an embodiment, the electronic device may input the basic transmit power P1 information to an AP transmit power sub field of the first trigger frame 923-1 or 923-2, and may transmit the same. The electronic device 910 may transmit the first trigger frame 923-1 to the external device 950 using the basic transmit power P1 within the TWT duration 1 933-1. The external device 950 may calculate a path loss L1 based on the basic transmit power P1 and a reception power of the first trigger frame 923-1. The external device 950 may transmit the first PS-poll frame (or a QoS null frame) 925-1 to the electronic device 910 using the basic transmit power P1. The electronic device 910 may calculate a path loss L2 based on the basic transmit power P1 and a reception power of the first PS-poll frame 925-1. The path loss may be calculated by exchanging the first trigger frame 923-1 and the first PS-poll frame 925-1. The external device 950 may determine a transmit power based on Equation 2. The electronic device 910 may determine a transmit power based on Equation 3. The electronic device 910 and the external device 950 may transmit the other radio frames including the downlink data and the uplink data using the determined transmit power.

According to an embodiment, the electronic device 910 may transmit the first trigger frame 923-1 in the target wake interval 1 931-1. The electronic device 910 may receive the first PS-poll frame 925-1 in the target wake interval 1 931-1. The external device may receive the first trigger frame 923-1 in the target wake interval 1 931-1. The external device 950 may transmit the first PS-poll frame 925-1 in the target wake interval 1 931-1. The electronic device 910 may determine an adjustment transmit power based on the path loss in the target wake interval 1 931-1. The external device 950 may determine the transmit power based on the path loss in the target wake interval 1 931-1.

According to an embodiment, the electronic device 910 may transmit the first trigger frame 923-2 in the target wake interval 2 931-2. The electronic device 910 may receive the first PS-poll frame 925-2 in the target wake interval 2 931-2. The external device 950 may receive the first trigger frame 923-2 in the target wake interval 2 931-2. The external device 950 may transmit the first PS-poll frame 925-2 in the target wake interval 2 931-2. The electronic device 910 may determine an adjustment transmit power based on the path loss in the target wake interval 2 931-2. The external device 950 may determine a transmit power based on the path loss in the target wake interval 2931-2.

Although FIG. 9 illustrates that the electronic device 910 determines the adjustment transmit power based on the path loss in every target wake interval 931-1 or 931-2, the electronic device 910 may perform the operation of determining the adjustment transmit power based on the path loss in every target wake interval corresponding to a designated period. For example, when the designated period is 2, the electronic device 910 may not perform the operation of determining the adjustment transmit power based on the path loss in the target wake interval 2 931-2.

Although FIG. 9 illustrates that the external device 950 determines the adjustment transmit power based on the path loss in every target wake interval 931-1 or 931-2, the external device 950 may perform the operation of determining the adjustment transmit power based on the path loss in a target wake interval corresponding to a designated period. For example, when the designated period is 2, the external device 950 may not perform the operation of determining the adjustment transmit power based on the path loss in the target wake interval 2 931-2.

In an embodiment, the external device 910 may determine the adjustment transmit power based on the path loss in a target wake interval in which the electronic device 910 determines the adjustment transmit power. For example, when the electronic device 910 performs the operation of determining the adjustment transmit power based on the path loss in the target wake interval 1 931-1, the external device 950 may perform the operation of determining the adjustment transmit power based on the path loss in the target wake interval 1 931-1.

In an embodiment, the external device 950 may determine the adjustment transmit power based on the path loss in a target wake interval in which the electronic device 910 does not determine the adjustment transmit power. For example, when the electronic device 910 performs the operation of determining the adjustment transmit power based on the path loss in the target wake interval 1 931-1, the external device 950 may perform the operation of determining the adjustment transmit power based on the path loss in the target wake interval 2 931-2.

In an embodiment, the electronic device 910 may transmit the first trigger frame 923-2 based on the determined adjustment transmit power although this operation is not illustrated in FIG. 9. In an embodiment, the external device 950 may transmit the first PS-poll frame 925-2 based on an already determined adjustment transmit power. For example, for the TWT duration 2 933-2, the electronic device 910 may transmit the first trigger frame 923-2 to the external device 950, based on the adjustment transmit power determined for the TWT duration 1 933-1. In another example, for the TWT duration 2 933-2, the external device 950 may transmit the first PS-poll frame 925-2 to the electronic device 910, based on the adjustment transmit power determined based on the path loss for the TWT duration 1 933-1.

Figure 10A:
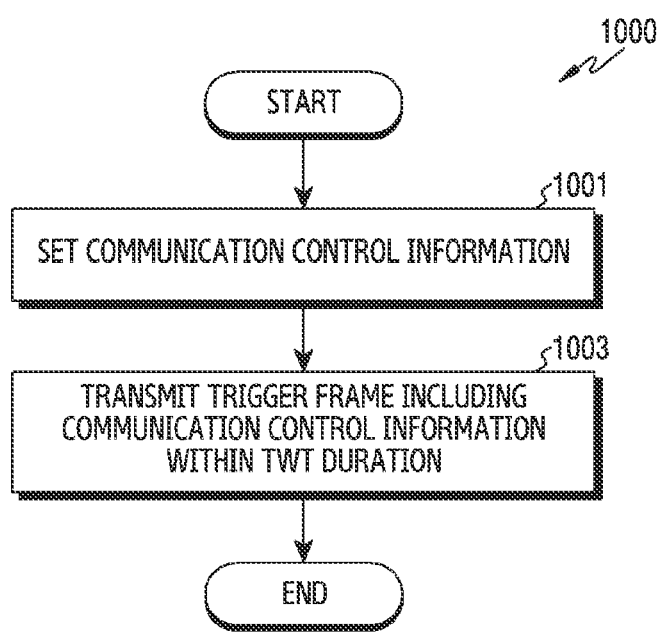
FIG. 10A is a flowchart illustrating example operations of an electronic device for determining an adjustment transmit power based on communication control information according to various embodiments.

FIG. 10A is a flowchart 1000 illustrating example operations of an electronic device for determining an adjustment transmit power based on communication control information according to various embodiments. The electronic device of FIG. 10A illustrates a non-limiting example of the electronic device 101 of FIG. 1. The external device of FIG. 10A illustrates a non-limiting example of the electronic device 102 of FIG. 1.

In FIG. 10A, operations of the electronic device for transmitting communication control information using a TWT frame will be described.

Referring to FIG. 10A, in operation 1001, the electronic device according to an embodiment may set communication control information. The communication control information may include an AP transmit power and an uplink target RSSI. The AP transmit power may include information regarding a power of a signal that is transmitted from the electronic device to the external device. The external device may identify a value of an AP transmit power allocated to a signal from received communication control information.

According to an embodiment, in operation 1003, the electronic device may transmit a trigger frame including the communication control information within a TWT duration. The electronic device may transmit the trigger frame including the communication control information to the external device within the TWT duration. The electronic device may transmit the trigger frame to the external device according to the AP transmit power. The trigger frame may be transmitted by the AP transmit power, and accordingly, a downlink path loss may be determined by the external device. An uplink transmit power may be determined in the external device based on the downlink path loss.

According to an embodiment, the electronic device may determine an adjustment transmit power based on a result of receiving a TWT-related signal (for example, uplink data) although this operation is not illustrated in FIG. 10A. The TWT-related signal may be transmitted or received based on a TWT setup. The external device may determine an adjustment transmit power and then may transmit uplink data including an adjustment transmit power value of the external device to the electronic device. The electronic device may determine the adjustment transmit power of the electronic device based on the result of receiving uplink data. The electronic device may identify the adjustment transmit power value of the external device included in the uplink data received from the external device. The electronic device may determine the adjustment transmit power of the electronic device, based on the adjustment transmit power value of the external device.

Although FIG. 10A illustrates that the electronic device transmits the trigger frame, embodiments of the disclosure are not limited thereto. For example, the external device may transmit a trigger frame to the electronic device, and the external device may set communication control information and may transmit the same to the electronic device.

Figure 10B:
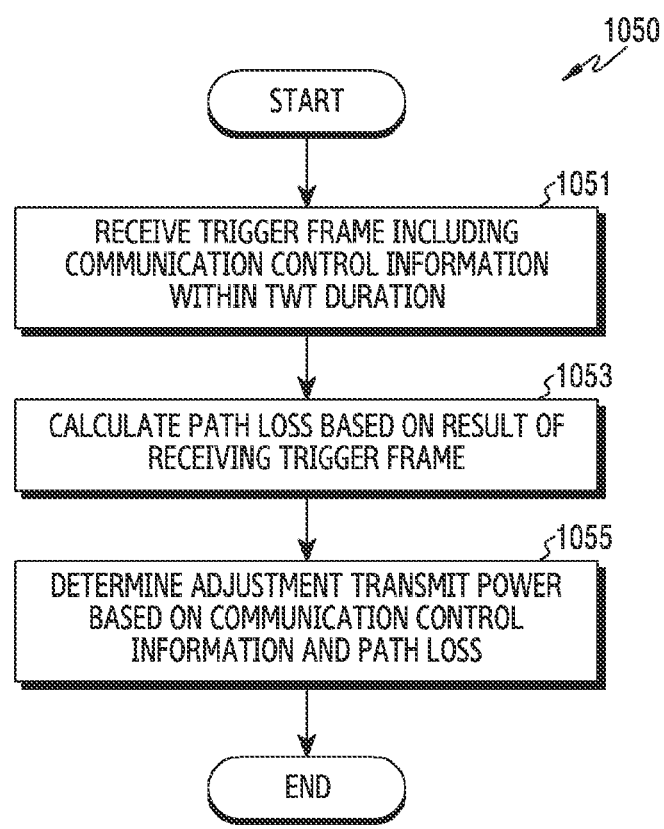
FIG. 10B is a flowchart illustrating example operations of an external device for determining an adjustment transmit power based on communication control information according to various embodiments.

FIG. 10B is a flowchart 1050 illustrating example operations of an external device for determining an adjustment transmit power based on communication control information according to various embodiments. The electronic device of FIG. 10B illustrates a non-limiting example of the electronic device 101. The external device of FIG. 10B illustrates a non-limiting example of the electronic device 102 of FIG. 1. In FIG. 10B, operations of the external device for receiving communication control information using a TWT frame will be described.

Referring to FIG. 10B, in operation 1051, the external device according to an embodiment may receive a trigger frame including communication control information within a TWT duration. The external device may receive the trigger frame including the communication control information from the electronic device within the TWT duration.

The communication control information may include an AP transmit power and an uplink target RSSI. The AP transmit power may include information regarding a power of a signal that is transmitted from the electronic device to the external device. The uplink target RSSI may include information regarding a target strength of a received signal when the electronic device receives a signal from the external device. The external device may receive a first trigger frame from the electronic device, based on a basic transmit power.

According to an embodiment, in operation 1053, the external device may calculate a path loss based on the result of receiving the trigger frame. The external device may measure a downlink reception power by receiving the trigger frame. The external device may identify a value of the AP transmit power allocated to a signal and the uplink target RSSI from the received communication control information. The external device may calculate a downlink path loss value by comparing the AP transmit power and the downlink reception power. The external device may determine a difference between the AP transmit power and the downlink reception power as a downlink path loss.

According to an embodiment, in operation 1055, the external device may determine an adjustment transmit power based on the communication control information and the path loss. The external device may determine an uplink path loss based on the downlink path loss calculated in operation 1053. The external device may identify the uplink target RSSI included in the communication control information. The external device may determine the adjustment transmit power, based on the downlink path loss and the uplink target RSSI. The determined adjustment transmit power may be lower than the basic transmit power.

The external device may transmit uplink data to the electronic device using the adjustment transmit power. The external device can reduce power consumption by transmitting the uplink data using the adjustment transmit power which is determined to be lower than the basic transmit power.

According to an embodiment, the external device may transmit uplink data including the determined adjustment transmit power value to the electronic device although this operation is not illustrated in FIG. 10B. The electronic device may determine an adjustment transmit power of the electronic device, based on the result of receiving the uplink data. The electronic device may determine the adjustment transmit power of the electronic device, based on the adjustment transmit power value of the external device included in the uplink data.

Although FIG. 10B illustrates that the external device determines the transmit power, embodiments of the disclosure are not limited thereto.

According to an embodiment, the external device may transmit a trigger frame to the electronic device, and accordingly, the electronic device may determine an adjustment transmit power based on a path loss.

According to an embodiment, the electronic device may transmit a trigger frame including communication control information to the external device. For example, the electronic device may transmit a trigger frame including an AP transmit power and an uplink target RSSI to the external device. The AP transmit power may refer to information regarding a downlink transmit power of the electronic device. The uplink target RSSI may refer to information regarding a target strength of a received signal when the electronic device receives a signal from the external device. For example, the uplink target RSSI may be calculated by the electronic device as shown in Equation 4 presented below:

$$\text{Uplink\_target\_RSSI} = \text{Receiver minimum input level sensitivity} + \alpha \quad \text{Equation 4}$$

Uplink_target_RSSI may refer, for example, to a target value of a strength of a signal received at the electronic device based on a receiver minimum input level sensitivity. The receiver minimum input level sensitivity value may refer, for example, to a designated minimum RF level of a WLAN signal that a receiver will receive or demodulate. α may refer, for example, to a margin regarding the receiver minimum input level sensitivity.

The external device may receive the trigger frame from the electronic device. The external device may identify the AP transmit power and the uplink target RSSI in the trigger frame. The external device may determine a difference between the AP transmit power and a reception power of the trigger frame as a downlink path loss L1. The external device may determine an adjustment transmit power by summing up the downlink path loss L1 and the uplink target RSSI. The external device may determine an uplink path loss based on the downlink path loss which is calculated in operation 1053. The external device may determine the adjustment transmit power of the external device, based on a target reception power (for example, the uplink target RSSI) of the electronic device and the path loss. In an embodiment, the determined adjustment transmit power may be lower than a basic transmit power.

The external device may transmit data using the adjustment transmit power. Power consumption of the external device can be reduced by transmitting data using the adjustment transmit power which is determined as a lower power.

Figure 11:
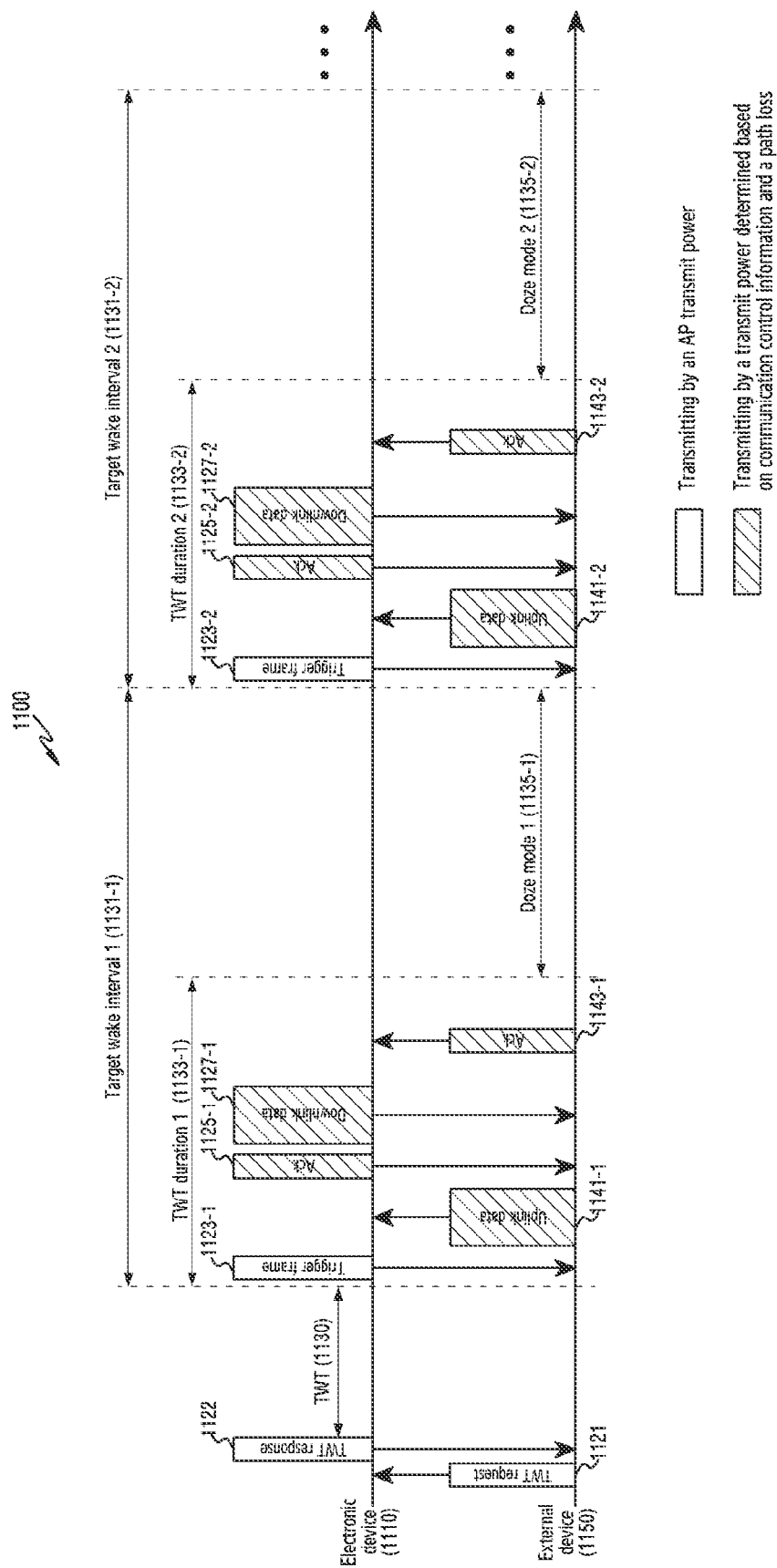
FIG. 11 is a diagram illustrating an example method for determining an adjustment transmit power based on communication control information according to various embodiments.

FIG. 11 is a diagram 1100 illustrating an example method for determining an adjustment transmit power based on communication control information according to various embodiments. The electronic device 1110 of FIG. 1 illustrates a non-limiting example of the electronic device 101 of FIG. 1. The external device 1150 of FIG. 11 illustrates a non-limiting example of the electronic device 102 of FIG. 1.

Referring to FIG. 11, the external device 1150 may transmit a TWT request frame 1121 to the electronic device 1110. The electronic device 1110 may transmit a TWT response frame 1122 to the external device in response to reception of the TWT request frame 1121. The TWT request frame 1121 may include at least one of a TWT 1130, a target wake interval 1131-1 or 1131-2, a TWT duration 1133-1 or 1133-2, a trigger sub field and a flow type sub field. The TWT response frame 1122 may include at least one of the TWT 1130, the target wake interval 1131-1 or 1131-2, the TWT duration 1133-1 or 1133-2, the trigger sub field and the flow type sub field information, as a response to the TWT request frame 1121. Although FIG. 11 illustrates both the TWT request frame 1121 and the TWT response frame 1122, the electronic device according to an embodiment may transmit TWT setup information included in the TWT response frame 1122 to the external device, without requesting the TWT request frame 1121 (or without receiving the TWT request frame 1121).

Although FIG. 11 illustrates that the TWT setup is completed by the external device 1150 transmitting the TWT request frame 1121 and the electronic device 1110 transmitting the TWT response frame 1122, the TWT request frame 1121 and the TWT response frame 1122 may be transmitted multiple times according to an embodiment. For example, when the TWT 1130, the target wake interval 1131-1 or 1131-2 or the TWT duration 1133-1 or 1133-2 set by the external device 1150 and/or the electronic device 1110 is different, the external device 1150 and/or the electronic device 1110 may complete the TWT setup through a plurality of TWT request frames 1121 and a plurality of TWT response frames 1122.

The TWT 1130 may indicate a time at which the TWT duration 1133-1 starts after the TWT setup. The target wake interval 1131-1 or 1131-2 may refer to a period during which the electronic device 1110 and the external device 1150 operate in a wake mode. The TWT duration 1133-1 or 1133-2 and a doze mode 1135-1 or 1135-2 may be repeated in the target wake interval 1131-1 or 1131-2. A signal may be transmitted and received between the electronic device 1110 and the external device 1150 within the TWT duration 1133-1 or 1133-2. The signal may include a trigger frame 1123-1 or 1123-2, uplink data 1141-1 or 1141-2, an Ack 1125-1 or 1125-2, downlink data 1127-1 or 1127-2, an Ack 1143-1 or 1143-2.

According to an embodiment, the electronic device 1110 may include an AP transmit power and an uplink target RSSI in the trigger frame 1123-1 as communication control information within the TWT duration 1 1133-1. The electronic device 1110 may transmit the trigger frame including the communication control information to the external device 1150 within the TWT duration 1 1133-1. The external device 1150 may receive the trigger frame 1123-1. The external device 1150 may identify the AP transmit power and the uplink target RSSI of the trigger frame 1123-1. The external device 1150 may calculate a path loss based on the AP transmit power and a reception power of the trigger frame 1123-1. The external device 1150 may determine an adjustment transmit power according to the calculated path loss and the uplink target RSSI. The external device 1150 may transmit the other radio frames including the uplink data 1141-1 using the determined adjustment transmit power.

According to an embodiment, the electronic device 1110 may include an AP transmit power and an uplink target RSSI in the trigger frame 1123-2 as communication control information within the TWT duration 2 1133-2. The electronic device 1110 may transmit the trigger frame 1123-2 including the communication control information to the external device 1150 within the TWT duration 2 1133-2. The external device 1150 may receive the trigger frame 1123-2. The external device 1150 may identify the AP transmit power and the uplink target RSSI of the trigger frame 1123-2. The external device 1150 may calculate a difference value between the AP transmit power and a reception power of the trigger frame 1123-2 as a path loss. The external device 1150 may determine an adjustment transmit power based on the calculated path loss and the uplink target RSSI. The external device 1150 may transmit the other radio frames including the uplink data 1141-2 using the determined adjustment transmit power.

According to an embodiment, when the external device 1150 transmits the uplink data 1141-1 or 1141-2, the external device 1150 may also transmit information on the adjustment transmit power which is determined according to the path loss and the uplink target RSSI. The electronic device 1110 may identify the information on the determined adjustment transmit power through the received uplink data 1141-1 or 1141-2. The electronic device 1110 may transmit the other radio frames including the downlink data 1127-1 or 1127-2 using the adjustment transmit power. Power consumption of the electronic device can be reduced by transmitting data using the adjustment transmit power which is determined as a lower power.

Although FIG. 11 illustrates that the electronic device 1110 determines the adjustment transmit power based on the path loss in every target wake interval 1131-1 or 1131-2, the external device 1150 may perform the operation of determining the adjustment transmit power based on the path loss in every target wake interval corresponding to a designated period. For example, when the designated period is 2, the external device 1150 may not perform the operation of determining the adjustment transmit power based on the path loss, in the target wake interval 2 1131-2.

In an embodiment, the electronic device 1110 may determine the adjustment transmit power based on uplink data in a target wake interval in which the external device 1150 determines the adjustment transmit power. For example, when the external device 1150 performs the operation of determining the adjustment transmit power based on the path loss in the target wake interval 1 1131-1, the electronic device 1110 may perform the operation of determining the adjustment transmit power based on the uplink data in the target wake interval 1 1131-1.

In an embodiment, the external device 1150 may determine the adjustment transmit power based on the path loss in a target wake interval in which the electronic device 1110 does not determine the adjustment transmit power. For example, when the external device 1150 performs the operation of determining the adjustment transmit power based on the path loss in the target wake interval 1 1131-1, the electronic device 1110 may not perform the operation of determining the adjustment transmit power based on the uplink data in the target wake interval 1 1131-1.

In an embodiment, the electronic device 1110 may transmit the trigger frame 1123-2 based on the determined adjustment transmit power although this operation is not illustrated in FIG. 11. For example, for the TWT duration 2 1133-2, the electronic device 1110 may transmit the trigger frame 1123-2 to the external device 1150 based on the adjustment transmit power which is determined for the TWT duration 1 1133-1.

Figure 12A:
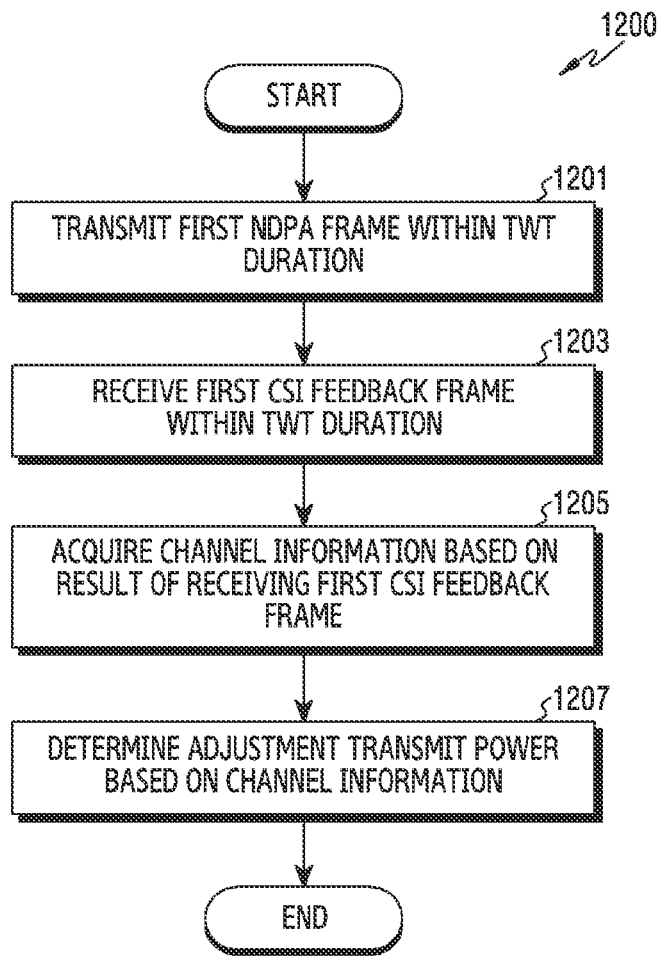
FIG. 12A is a flowchart illustrating example operations of an electronic device for determining an adjustment transmit power based on a null data packet announcement (NDPA) frame and a channel state information (CSI) feedback according to various embodiments.

FIG. 12A is a flowchart 1200 illustrating example operations of an electronic device for determining an adjustment transmit power based on an NDPA frame and a CSI feedback according to various embodiments. The electronic device of FIG. 12A illustrates a non-limiting example of the electronic device 101. The external device of FIG. 12A illustrates a non-limiting example of the electronic device 102 of FIG. 1.

In FIG. 12A, operations of the electronic device for receiving CSI feedback information using a TWT frame will be described.

Referring to FIG. 12A, in operation 1201, the electronic device according to an embodiment may transmit a first NDPA frame within a TWT duration. The electronic device may transmit a first NDP frame to the external device, instead of the first NDPA frame. The first NDPA frame (or the first NDP frame) may include information for the electronic device to request a first CSI feedback frame from the external device. The electronic device may transmit the first NDPA frame (or the first NDP frame) based on a TWT setup.

According to an embodiment, in operation 1203, the electronic device may receive the first CSI feedback frame from the external device within the TWT duration. In response to transmission of the first NDPA frame (or the first NDP frame), the electronic device may receive the first CSI feedback frame from the external device. The electronic device may acquire channel information by receiving the first CSI feedback frame. The first CSI feedback frame may include channel information. The channel information may include signal quality information. The signal quality information may include SNR information for each stream.

According to an embodiment, in operation 1205, the electronic device may acquire channel information based on the result of receiving the first CSI feedback frame. The electronic device may calculate a path loss value based on the signal quality information included in the first CSI feedback frame. For example, the electronic device may calculate the path loss using the SNR information for each channel.

According to an embodiment, in operation 1207, the electronic device may determine an adjustment transmit power based on the channel information. The electronic device may determine the adjustment transmit power using an SNR for each stream, which is included in the first CSI feedback frame. The electronic device may calculate a path loss based on the SNR for each stream. The electronic device may determine the adjustment transmit power based on the path loss. According to an embodiment, the determined adjustment transmit power may be lower than a basic transmit power. The electronic device may transmit data using the adjustment transmit power. The electronic device can reduce power consumption of the electronic device by transmitting data to the external device using the adjustment transmit power determined to be lower than the basic transmit power.

Although FIG. 12A illustrates that the electronic device determines the transmit power, embodiments of the disclosure are not limited thereto.

According to an embodiment, the external device may transmit the first NDPA (or the first NDP frame) to the electronic device, and the electronic device may transmit the first CSI feedback frame, and accordingly, the external device may calculate a path loss and may calculate an adjustment transmit power.

Figure 12B:
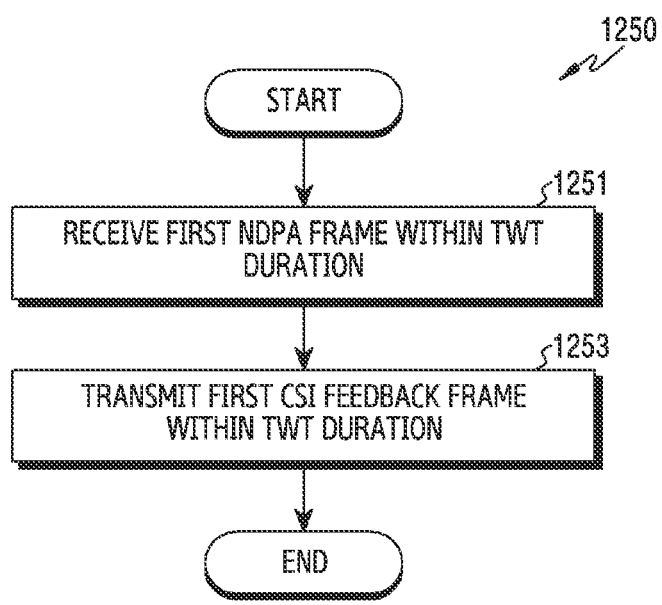
FIG. 12B is a flowchart illustrating example operations of an external device for determining an adjustment transmit power based on an NDPA frame and a CSI feedback according to various embodiments.

FIG. 12B is a flowchart 1250 illustrating example operations of an external device for determining an adjustment transmit power based on an NDPA frame and a CSI feedback according to various embodiments. The electronic device of FIG. 12B illustrates a non-limiting example of the electronic device 101 of FIG. 1. The external device of FIG. 12B illustrates a non-limiting example of the electronic device 102 of FIG. 1. In FIG. 12B, operations of the external device for transmitting CSI feedback information using a TWT frame will be described.

Referring to FIG. 12B, in operation 1251, the external device according to an embodiment may receive a first NDPA frame within a TWT duration. The external device may receive the first NDPA frame (or the first NDP frame) from the electronic device within the TWT duration. The first NDPA frame (or the first NDP frame) may include information for the electronic device to request a first CSI feedback frame from the external device. The external device may identify information for requesting the first CSI feedback frame from the received first NDPA frame (or the first NDP frame).

According to an embodiment, in operation 1253, the external device may transmit the first CSI feedback frame within the TWT duration. The external device may transmit the first CSI feedback frame to the electronic device within the TWT duration. For example, in response to transmission of the first NDPA frame (or the first NDP frame), the external device may transmit the first CSI feedback frame to the electronic device. The first CSI feedback frame may include channel information. The channel information may include signal quality information. For example, the signal quality information may include SNR information for each stream.

Although FIG. 12B illustrates that the external device receives the first NDPA frame and transmits the first CSI feedback frame, embodiments of the disclosure are not limited thereto.

According to an embodiment, the external device may transmit the first NDPA frame to the electronic device, and the electronic device may transmit the first CSI feedback frame to the external device in response to the first NDPA FRAME, and accordingly, the external device may calculate an adjustment transmit power.

When the electronic device and the external device support transmit beamforming, the electronic device may transmit the first NDPA frame (or the first NDP frame) within the TWT duration after a TWT setup. The electronic device may receive the first CSI feedback frame from the external device. The first NDPA frame (or the first NDP frame) may refer to a signal that requests the first CSI feedback frame from the external device. The first CSI feedback frame may include signal quality information. For example, the signal quality information may include an SNR for each stream. In an embodiment, the electronic device may transmit the first NDPA frame (or the first NDP frame) prior to transmitting downlink data to the external device. In response to this, the electronic device may receive the first CSI feedback frame from the external device. The electronic device may acquire channel information based on the result of receiving the first CSI feedback frame. The electronic device may identify signal quality information in the first CSI feedback frame. For example, the signal quality information may include an SNR for each stream. The electronic device may calculate a path loss using the signal quality information (for example, an SNR for each stream). The electronic device may determine a transmit power based on the path loss. In an embodiment, the external device may transmit a second NDPA frame (or a second NDP frame), and in response to this, may receive a second CSI feedback frame from the electronic device. The external device may acquire channel information based on the result of receiving the second CSI feedback frame. The external device may identify signal quality information in the second CSI feedback frame. For example, the signal quality information may include an SNR for each stream.

According to an embodiment, the electronic device and the external device may perform communication using a transmit beamforming method. The transmit beamforming method may be a beamforming method included in at least one of the WiFi standards, 802.11n, 802.11ac, and/or 802.11ax. The electronic device may determine a transmit power for transmit beamforming communication. The electronic device may determine a transmit power for transmit beamforming communication using a CSI feedback received from the external device. The external device may determine the transmit power for transmit beamforming communication. The external device may determine the transmit power for transmit beamforming communication using the CSI feedback received from the electronic device.

According to an embodiment, table 2 shows an example of a very high throughput (VHT) compressed beamforming frame including CSI feedback information. The VHT compressed beamforming frame may include an SNR for each stream and transmission channel-related information. The transmission channel-related information may include beamforming feedback matrix information.

TABLE 2

˅ IEEE 802.11 wireless LAN
  ˅ Fixed parameters
    Category code: VHT (21)
    VHT Action: VHT Compressed Beamforming (0)
  ˅ VHT MIMO Control: 0x048409, Nc Index: 2 Columns, Nr Index: 2 Rows, Channel Width: 20 MHz,
    Grouping (Ng): 1 (No Grouping), Feedback Type: SU
      .... .... .... .... .001 = Nc Index: 2 Columns (0×1)
      .... .... .... .... ..00 1... = Nr Index: 2 Rows (0×1)
      .... .... .... .... 00.. .... = Channel Width: 20 MHz (0×0)
      .... .... .... ..00 .... .... = Grouping (Ng): 1 (No Grouping) (0×0)
      .... .... .... .1.. .... .... = Codebook Information: 0×1
      .... .... .... 0... .... .... = Feedback Type: SU (0×0)
      .... .... .000 .... .... .... = Remaining Feedback Segments: 0×0
      .... .... 1... .... .... .... = First Feedback Segments: 0×1
      .... ..00 .... .... .... .... = Reserved: 0×0
      0000 01.. .... .... .... .... = Sounding Dialog Token Number: 0×01
  ˅ VHT Compressed Beamforming Report: 460c565c8109269964a105279c70c209279d78f20928a080...
    ˅ Average Signal to Noise Ratio
      Stream 1 - Signal to Noise Ratio: 39.50dB
      Stream 2 - Signal to Noise Ratio: 25.00dB
    ˅ PHI and PSI Angle Decode
      PHI(6 bits): PHI11: 21,
      PSI(4 bits): PSI21: 9,
    ˅ Beamforming Feedback Matrix For example, when communication is performed using the transmit beamforming method, the electronic device may calculate a path loss value using an SNR value for each stream which is included in the CSI feedback. In addition, the electronic device can enhance quality of a received signal using beamforming feedback matrix information. The electronic device can effectively schedule a time of exchanging an NDPA frame (or an NDP frame) and a CSI feedback frame by performing a TWT setup with the external device.

According to an embodiment, the external device may calculate a path loss using signal quality information (for example, an SNR for each stream). The external device may determine an adjustment transmit power based on the path loss.

The electronic device and the external device may calculate an adjustment transmit power based on Equation 5.

$$P\_new = \text{Receiver minimum input level sensitivity} + \alpha + P\_pre - (SNR\_feedback - N) \quad \text{Equation 5}$$

P_new may refer, for example, to an adjustment transmit power which is calculated based on a target RSSI and a path loss. The receiver minimum input level sensitivity may refer to a designated minimum RF level of a WLAN signal that a receiver will receive or demodulate. The receiver minimum input level sensitivity may be determined based on a minimum required data rate and table 1. α may refer, for example, to a margin regarding the receiver minimum input level sensitivity. The SNR_feedback may refer to an SNR for each stream in the CSI feedback frame. For example, if there are two SNRs for each stream, the SNR_feedback may refer, for example, to a small value or an average value of the two SNRs for each stream. N is a white noise value of a corresponding device, and may be exchanged between the electronic device and the external device through OOB or may refer, for example, to a white noise of the electronic device. Typically, the white noise may refer to a constant value as a characteristic of a WLAN chip. In Equation 5, P_pre−(SNR_feedback−N) may correspond to a path loss based on an SNR feedback.

Figure 13:
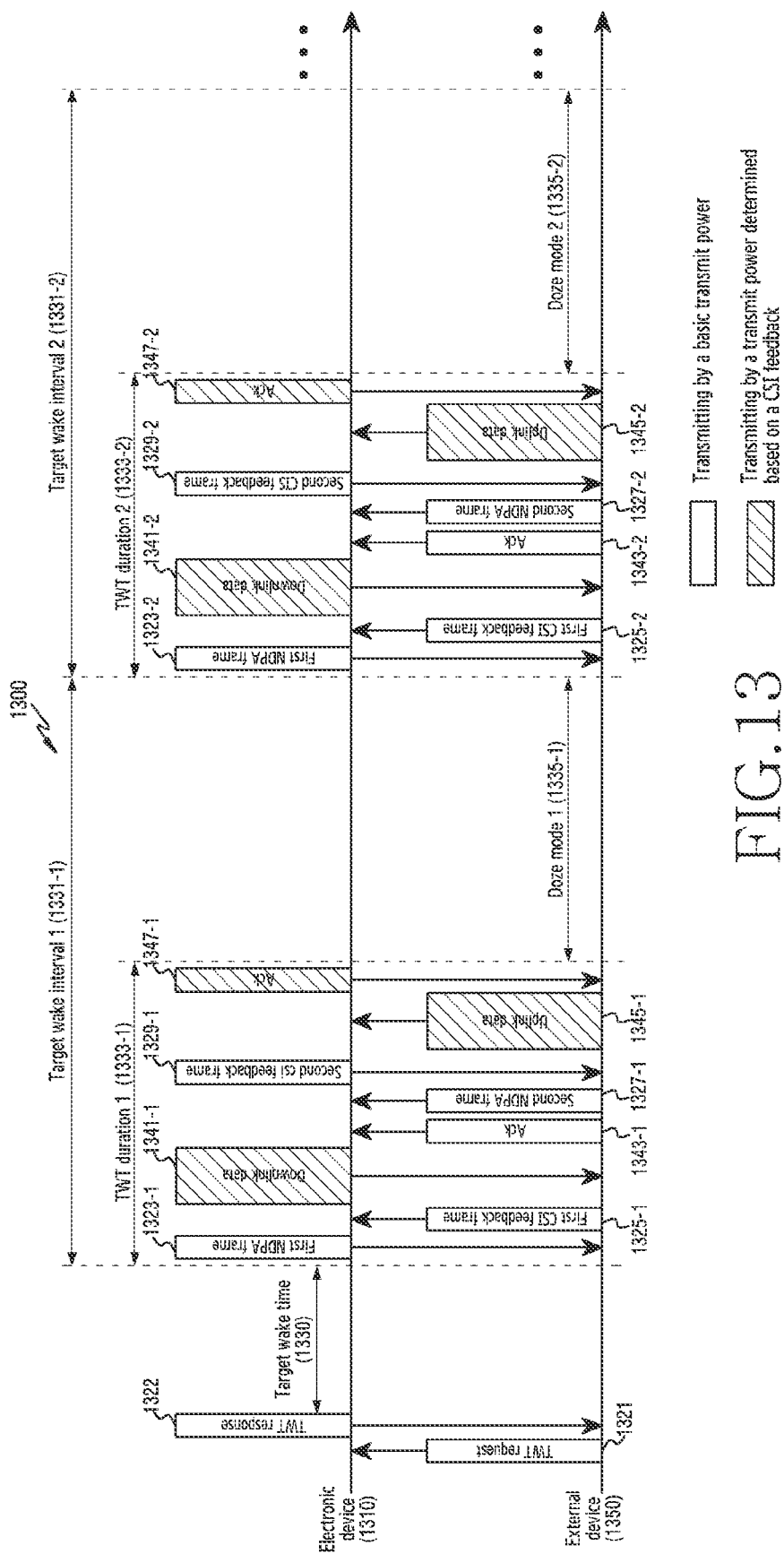
FIG. 13 is a diagram illustrating an example method for determining an adjustment transmit power based on an NDPA frame and a CSI feedback according to various embodiments.

FIG. 13 is a diagram 1300 illustrating an example method for determining an adjustment transmit power based on an NDPA frame and a CSI feedback according to various embodiments. The electronic device of FIG. 13 illustrates a non-limiting example of the electronic device 101. The external device of FIG. 13 illustrates a non-limiting example of the electronic device 102 of FIG. 1.

Referring to FIG. 13, the external device 1350 may transmit a TWT request frame 1321 to the electronic device 1310. The electronic device 1310 may transmit a TWT response frame 1322 to the external device 1350 in response to reception of the TWT request frame 1121. The TWT request frame 1321 may include at least one piece of information of a TWT 1330, a target wake interval 1331-1 or 1331-2, a TWT duration 1333-1 or 1333-2, a trigger sub field and a flow type sub field. The TWT response frame 1322 may include at least one piece of information of the TWT 1330, the target wake interval 1331-1 or 1331-2, the TWT duration 1331-1 or 1333-2, the trigger sub field and the flow type sub field, as a response to the TWT request frame 1321.

Although FIG. 13 illustrates both the TWT request frame 1321 and the TWT response frame 1322, the electronic device 1310 according to an embodiment may not receive the TWT request frame 1321 and may transmit TWT setup information included in the TWT response frame 1322 to the external device.

Although FIG. 13 illustrates that the TWT setup is completed by the external device 1350 transmitting the TWT request frame 1321 and the electronic device 1310 transmitting the TWT response frame 1322, the TWT request frame 1321 and the TWT response frame 1322 may be transmitted multiple times according to an embodiment. For example, when the TWT 1330, the target wake interval 1331-1 or 1331-2 or the TWT duration 1331-1 or 1333-2 set by the external device 1350 and/or the electronic device 1310 is different, the external device and/or the electronic device may complete the TWT setup through a plurality of TWT request frames 1321 and a plurality of TWT response frames 1322.

The TWT 1330 may indicate a time at which the TWT duration 1333-1 starts after the TWT setup. The target wake interval 1331-1 or 1331-2 may refer to a period during which the electronic device 1310 and the external device 1350 operate in a wake mode. The TWT duration 1333-1 or 1333-2 and a doze mode 1335-1 or 1335-2 may be repeated in every target wake interval 1331-1 or 1331-2. A signal may be transmitted and received between the electronic device 1310 and the external device 1350 within the TWT duration 1333-1 or 1333-2. The signal may include a first NDPA frame 1323-1 or 1323-2 (or a first NDP frame), a first CSI feedback frame 1325-1 or 1325-2, downlink data 1341-1 or 1341-2, an Ack 1343-1 or 1343-2, a second NDPA frame 1327-1 or 1327-2 (or a second NDP frame), a second CSI feedback frame 1329-1 or 1329-2, uplink data 1345-1 or 1345-2, and/or an Ack 1347-1 or 1347-2.

If there is downlink data 1341-1 or 1341-2 to be transmitted by the electronic device 1310 when the TWT duration 1333-1 or 1333-2 starts, the electronic device 1310 may transmit the first NDPA frame 1323-1 or 1323-2 (or the first NDP frame). The electronic device may receive the first CSI feedback frame 1325-1 or 1325-2 from the external device 1350 in response to the first NDPA frame 1323-1 or 1323-2 (or the first NDP frame). The electronic device may determine an adjustment transmit power using Equation 5, based on signal quality information of a reception signal of the first CSI feedback 1325-1 or 1325-2. The electronic device may transmit the downlink data 1341-1 or 1341-2 using the adjustment transmit power.

If there is uplink data 1345-1 or 1345-2 to be transmitted, the external device 1350 may transmit the second NDPA frame 1327-1 or 1327-2 (or the second NDP frame. The external device 1350 may acquire the second CSI feedback frame 1329-1 or 1329-2 from the electronic device 1310 in response to the second NDPA frame (or the second NDP frame) 1327-1 or 1327-2. In addition, the external device may determine an adjustment transmit power using Equation 5, based on signal quality information of a reception signal of the second CSI feedback frame 1329-1 or 1329-2. The external device may transmit the uplink data 1345-1 or 1345-2 using the adjustment transmit power.

According to an embodiment, the electronic device 1310 may transmit the first NDPA frame 1323-1 in the target wake interval 1 1331-1. The electronic device 1310 may receive the first CSI feedback frame 1325-1 in the target wake interval 1 1331-1. The external device 1350 may transmit the second NDPA frame 1327-1 in the target wake interval 1 1331-1. The external device 1350 may receive the second CSI feedback frame 1329-1 in the target wake interval 1 1331-1. The electronic device may determine an adjustment transmit power based on a path loss which is based on the first CSI feedback frame 1329-1 in the target wake interval 1 1331-1. The first CSI feedback frame may include signal quality information. For example, the signal quality information may include SNR information for each stream. The electronic device may acquire channel information based on the result of receiving the first CSI feedback frame. The electronic device may identify signal quality information in the first CSI feedback frame. For example, the signal quality information may include SNR information for each stream. The electronic device may calculate a path loss using the signal quality information (for example, SNR information for each stream). The electronic device may determine the adjustment transmit power based on the path loss. The external device may determine a transmit power based on a path loss in the target wake interval 1 1331-1. The external device may transmit the second NDPA frame (or the second NDP frame), and in response to this, may receive the second CSI feedback frame from the electronic device. The external device may acquire channel information based on the result of receiving the second CSI feedback frame. The external device may identify signal quality information in the second CSI feedback frame. For example, the signal quality information may include SNR information for each stream. The external device may calculate a path loss using the signal quality information (for example, SNR information for each stream). The external device may determine an adjustment transmit power based on the path loss.

According to an embodiment, the electronic device 1310 may transmit the first NDPA frame 1323-2 in the target wake interval 2 1331-2. The electronic device 1310 may receive the first CSI feedback frame 1325-2 in the target wake interval 2 1331-2. The external device 1350 may transmit the second NDPA frame 1327-2 in the target wake interval 2 1331-2. The external device 1350 may receive the second CSI feedback frame 1329-2 in the target wake interval 2 1331-2. The electronic device may determine an adjustment transmit power based on a path loss in the target wake interval 2 1331-2. The external device may determine a transmit power based on the path loss in the target wake interval 2 1331-2.

Although FIG. 13 illustrates that the electronic device and the external device determine the adjustment transmit power based on the path loss in every target wake interval 1331-1, 1331-2, the electronic device 1310 may perform the operation of determining the adjustment transmit power based on the path loss in every target wake interval 1331-1 or 1331-2 corresponding to a designated period. For example, when the designated period is 2, the electronic device 1310 may not perform the operation of determining the adjustment transmit power based on the path loss in the target wake interval 2 1331-2.

In an embodiment, the external device 1350 may determine the adjustment transmit power based on the path loss in a target wake interval in which the electronic device 1310 determines the adjustment transmit power. For example, when the electronic device 1310 performs the operation of determining the adjustment transmit power based on the path loss in the target wake interval 1 1331-1, the external device 1350 may perform the operation of determining the adjustment transmit power based on the path loss in the target wake interval 1 1331-1.

In an embodiment, the external device 1350 may determine the adjustment transmit power based on the path loss in a target wake interval in which the electronic device 1310 does not determine the adjustment transmit power. For example, when the electronic device 1310 performs the operation of determining the adjustment transmit power based on the path loss in the target wake interval 1 1331-1, the external device 1350 may perform the operation of determining the adjustment transmit power based on the path loss in the target wake interval 2 1331-2.

In an embodiment, the electronic device 1310 may transmit the first NDPA frame 1323-2 based on the determined adjustment transmit power although this operation is not illustrated in FIG. 13. In an embodiment, the external device 1350 may transmit the first CSI feedback frame 1325-2 based on an already determined adjustment transmit power. For example, for the TWT duration 2 1333-2, the electronic device 1310 may transmit the first NDPA frame 1323-2 to the external device 1350 based on the adjustment transmit power which is determined for the TWT duration 1 1333-1. In another example, for the TWT duration 2 1333-2, the external device 1350 may transmit the first CSI feedback frame 1325-2 to the electronic device 1310, based on the adjustment transmit power which is determined based on the path loss for the TWT duration 1 1333-1.

In various embodiments of the disclosure, the electronic device (for example, the electronic device 101 of FIG. 1) and the external device (for example, the electronic device 102 of FIG. 1) may control the adjustment transmit power through a method of using a trigger frame and a PS-poll (or QoS null) frame, using a trigger frame and uplink data, using an NDPA frame (or an NDP frame) and a CSI feedback frame, or using basic transmit power information. The electronic device and the external device may control the adjustment transmit power using other methods which are implemented by combinations of the above-described method.

According to an embodiment of the disclosure as described above, an electronic device (for example, the electronic device 101 of FIG. 1) may include a display (for example, the display module 160 of FIG. 1), a communication circuit (for example, the communication module 190 of FIG. 1), a memory (for example, the memory 130 of FIG. 1) configured to store instructions; and at least one processor (for example, the processor 120 of FIG. 1) operatively connected with the display, the communication circuit, and the memory. When the stored instructions are executed, the at least one processor may perform wireless connection with an external device (for example, the electronic device 102 of FIG. 1) using the communication circuit, may perform a TWT setup including a TWT, a TWT duration, and a target wake interval with the external device, may transmit a first signal to the external device within the TWT duration, may receive a second signal from the external device within the TWT duration, may determine an adjustment transmit power based on the first signal and the second signal, and may transmit data using the adjustment transmit power.

In an embodiment, when the stored instructions are executed, in order to perform the TWT setup, the electronic device (for example, the electronic device 101 of FIG. 1) may acquire at least one of information of a refresh rate of the external device (for example, the electronic device 102 of FIG. 1), information of the number of bits per frame, or information of a network bandwidth, and may perform the TWT setup based on at least one of the information of the refresh rate, the information of the number of bits per frame, or the information of the network bandwidth.

In an embodiment, when the stored instructions are executed, in order to determine the adjustment transmit power, the electronic device (for example, the electronic device 101 of FIG. 1) may calculate a path loss, based on the first signal and the second signal, and may determine the adjustment transmit power, based on the path loss.

In an embodiment, when the stored instructions are executed, the electronic device (for example, the electronic device 101 of FIG. 1) may further be configured to transmit basic transmit power information to the external device (for example, the electronic device 102 of FIG. 1), and, when the stored instructions are executed, in order to determine the adjustment transmit power based on the first signal and the second signal, the electronic device may be configured to determine the adjustment transmit power, based on the basic transmit power information and a result of receiving the second signal, and the first signal may be a trigger frame and the second signal may be a PS-poll frame.

In an embodiment, when the stored instructions are executed, the electronic device (for example, the electronic device 101 of FIG. 1) may further be configured to set communication control information, and, when the stored instructions are executed, in order to transmit the first signal to the external device (for example, the electronic device 102 of FIG. 1) within the TWT duration, the electronic device may be configured to transmit the first signal including the communication control information to the external device within the TWT duration, and, when the stored instructions are executed, in order to determine the adjustment transmit power based on the first signal and the second signal, the electronic device may be configured to determine the adjustment transmit power based on the second signal, and the communication control information may include at least one of an AP transmit power and an uplink target RSSI, the first signal may be a trigger frame, and the second signal may be uplink data.

In an embodiment, when the stored instructions are executed, in order to determine the adjustment transmit power based on the first signal and the second signal, the electronic device (for example, the electronic device 101 of FIG. 1) may be configured to acquire channel information based on a result of receiving the second signal, and to determine the adjustment transmit power based on the channel information, and the first signal may be an NDPA frame or an NDP frame, and the second signal may be a CSI feedback frame.

In an embodiment, the CSI feedback frame may include signal quality information for each stream.

According to an example embodiment, an external device (for example, the electronic device 102 of FIG. 1) may include: a display (for example, the display module 160 of FIG. 1), a communication circuit (for example, the communication module 190 of FIG. 1), a memory (for example, the memory 130 of FIG. 1) configured to store instructions, and at least one processor (for example, the processor 120 of FIG. 1) electrically connected with the display, the communication circuit, and the memory. When the stored instructions are executed, the at least one processor may be configured to: control the external device to perform wireless connection with an electronic device (for example, the electronic device 101 of FIG. 1) using the communication circuit, perform a target wake time (TWT) setup including a TWT, a TWT duration, and a target wake interval with the electronic device, control the external device to receive a first signal from the electronic device within the TWT duration, control the external device to transmit a second signal to the electronic device within the TWT duration, determine an adjustment transmit power based on the first signal and the second signal, and control the external device to transmit data using the adjustment transmit power.

In an example embodiment, when the stored instructions are executed, in order to perform the TWT setup, the external device (for example, the electronic device 102 of FIG. 1) may be configured to: transmit at least one of information of a refresh rate of the external device, information of the number of bits per frame, and receive, from the electronic device (for example, the electronic device 101 of FIG. 1), the TWT setup performed based on at least one of the information of the refresh rate, the information of the number of bits per frame, or information of a network bandwidth.

In an example embodiment, when the stored instructions are executed, in order to determine the adjustment transmit power, the external device (for example, the electronic device 102 of FIG. 1) may be configured to: calculate a path loss based on the first signal and the second signal, and may determine the adjustment transmit power based on the path loss.

In an example embodiment, when the stored instructions are executed, the external device (for example, the electronic device 102 of FIG. 1) may further be configured to: receive basic transmit power information from the electronic device (for example, the electronic device 101 of FIG. 1), and, when the stored instructions are executed, in order to determine the adjustment transmit power based on the first signal and the second signal, the external device may be configured to: determine the adjustment transmit power based on the basic transmit power information and a result of receiving the first signal, and the first signal may be a trigger frame and the second signal may be a PS-poll frame.

In an example embodiment, when the stored instructions are executed, in order to receive the first signal from the electronic device (for example, the electronic device 101 o FIG. 1) within the TWT duration, the external device (for example, the electronic device 102 of FIG. 1) may be configured to: receive the first signal including communication control information from the electronic device within the TWT duration, and, when the stored instructions are executed, in order to determine the adjustment transmit power based on the first signal and the second signal, the external device (for example, the electronic device 102 of FIG. 1) may be configured to: determine the adjustment transmit power based on the communication control information and a result of receiving the first signal, and the communication control information may include at least one of an AP transmit power and an uplink target RSSI, the first signal may include a trigger frame, and the second signal may include uplink data.

In an example embodiment, when the stored instructions are executed, in order to transmit the second signal to the electronic device (for example, the electronic device 101 of FIG. 1) within the TWT duration, the external device (for example, the electronic device 102 of FIG. 1) may be configured to: transmit the second signal including channel information to the electronic device, and the first signal may include an NDPA frame or an NDP frame and the second signal may include a CSI feedback frame.

According to an example embodiment of the disclosure as described above, a method of an electronic device (for example, the electronic device 101 of FIG. 1) may include: performing wireless connection with an external device (for example, the electronic device 102 of FIG. 1); performing a target wake time (TWT) setup including a TWT, a TWT duration, and a target wake interval of the external device; transmitting a first signal to the external device within the TWT duration; receiving a second signal from the external device within the TWT duration; determining an adjustment transmit power based on the first signal and the second signal; and transmitting data using the adjustment transmit power.

In an example embodiment, performing the TWT setup may include: acquiring at least one of information of a refresh rate of the external device (for example, the electronic device 102 of FIG. 1), information of the number of bits per frame, or information of a network bandwidth; and performing the TWT setup based on at least one of the information of the refresh rate, the information of the number of bits per frame, or the information of the network bandwidth.

In an example embodiment, determining the adjustment transmit power may include: calculating a path loss, based on the first signal and the second signal; and determining the adjustment transmit power, based on the path loss.

In an example embodiment, the method may further include: transmitting basic transmit power information to the external device (for example, the electronic device 102 of FIG. 1), and determining the adjustment transmit power based on the first signal and the second signal may include determining the adjustment transmit power, based on the basic transmit power information and a result of receiving the second signal, and the first signal may be a trigger frame and the second signal may be a PS-poll frame.

In an example embodiment, the method may further include: setting communication control information, and transmitting the first signal to the external device (for example, the electronic device 102 of FIG. 1) within the TWT duration may include: transmitting the first signal including the communication control information to the external device within the TWT duration, and determining the adjustment transmit power based on the first signal and the second signal may include: determining the adjustment transmit power based on the second signal, and the communication control information may include: at least one of an AP transmit power and an uplink target RSSI, the first signal may be a trigger frame, and the second signal may be uplink data.

In an example embodiment, determining the adjustment transmit power based on the first signal and the second signal may include: acquiring channel information based on a result of receiving the second signal; and determining the adjustment transmit power based on the channel information, and the first signal may be an NDPA frame or an NDP frame and the second signal may be a CSI feedback frame.

In an example embodiment, the CSI feedback frame may include signal quality information for each stream.

The electronic device according to an example embodiment of the disclosure may be one of various types of electronic devices. The electronic device may include, for example, a portable communication device (e.g., a smart phone), a computer device, a portable multimedia device, a portable medical device, a camera, a wearable device, a home appliance, or the like. According to an embodiment of the disclosure, the electronic device is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to refer to similar or related elements. It is to be understood that a singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment of the disclosure may be implemented as software (e.g., the program 1140) including one or more instructions that are stored in a storage medium (e.g., internal memory 1136 or external memory 1138) that is readable by a machine (e.g., the electronic device 101). For example, a processor (e.g., the processor 1120) of the machine (e.g., the electronic device 1101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in other components. According to an embodiment, one or more of the above-described components or operations may be omitted, or one or more other components or operations may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device comprising:
   a display;
   a communication circuit;
   a memory storing instructions; and
   at least one processor, comprising processor circuitry, operatively connected with the display, the communication circuit, and the memory,
   wherein, when the stored instructions are executed, the at least one processor, individually and/or collectively, is configured to:
   control the electronic device to perform wireless connection with an external device using the communication circuit;
   obtain information of a refresh rate of the external device;
   perform, based on the information of the refresh rate, a target wake time (TWT) setup comprising a TWT, a TWT duration, and a target wake interval with the external device;
   control the electronic device to transmit a first signal to the external device within the TWT duration;

control the electronic device to receive a second signal from the external device within the TWT duration, the second signal comprising a TWT-related signal;
determine an adjustment transmit power based on the first signal and the second signal; and
control the electronic device to transmit data using the adjustment transmit power.

2. The electronic device of claim 1, wherein, when the stored instructions are executed, the at least one processor is configured to determine the TWT duration and the target wake interval based on the information of the refresh rate.

3. The electronic device of claim 1, wherein, when the stored instructions are executed, in order to determine the adjustment transmit power, the at least one processor is configured to:
calculate a path loss, based on the first signal and the second signal; and
determine the adjustment transmit power, based on the path loss.

4. The electronic device of claim 1, wherein, when the stored instructions are executed, the at least one processor is further configured to control the electronic device to transmit basic transmit power information to the external device,
wherein, when the stored instructions are executed, in order to determine the adjustment transmit power based on the first signal and the second signal, the at least one processor is configured to: determine the adjustment transmit power, based on the basic transmit power information and a result of receiving the second signal,
wherein the first signal includes a trigger frame, and
wherein the second signal includes a PS-poll frame.

5. The electronic device of claim 1, wherein, when the stored instructions are executed, the at least one processor is further configured to: set communication control information,
wherein, when the stored instructions are executed, in order to transmit the first signal to the external device within the TWT duration, the at least one processor is configured to control the electronic device to transmit the first signal comprising the communication control information to the external device within the TWT duration,
wherein, when the stored instructions are executed, in order to determine the adjustment transmit power based on the first signal and the second signal, the at least one processor is configured to: determine the adjustment transmit power based on the second signal,
wherein the communication control information comprises at least one of an AP transmit power and an uplink target RSSI,
wherein the first signal includes a trigger frame, and
wherein the second signal includes uplink data.

6. The electronic device of claim 1, wherein, when the stored instructions are executed, in order to determine the adjustment transmit power based on the first signal and the second signal, the at least one processor is configured to: acquire channel information based on a result of receiving the second signal, and determine the adjustment transmit power based on the channel information,
wherein the first signal includes an NDPA frame or an NDP frame, and
wherein the second signal includes a CSI feedback frame.

7. The electronic device of claim 6, wherein the CSI feedback frame comprises signal quality information for each stream.

8. An external device comprising:
a display;
a communication circuit;
a memory storing instructions; and
at least one processor, comprising processor circuitry, electrically connected with the display, the communication circuit, and the memory,
wherein, when the stored instructions are executed, the at least one processor is configured, individually and/or collectively, to:
control the external device to perform wireless connection with an electronic device using the communication circuit;
control the external device to transmit information of a refresh rate of the external device;
perform a target wake time (TWT) setup comprising a TWT, a TWT duration, and a target wake interval with the electronic device by controlling the external device to receive, from the electronic device, the TWT setup performed based on the information of the refresh rate;
control the external device to receive a first signal from the electronic device within the TWT duration;
control the external device to transmit a second signal to the electronic device within the TWT duration, the second signal comprising a TWT-related signal based on the TWT setup;
determine an adjustment transmit power based on the first signal and the second signal; and
control the external device to transmit data using the adjustment transmit power.

9. The external device of claim 8, wherein the TWT duration and the target wake interval are determined based on the information of the refresh rate.

10. The external device of claim 8, wherein, when the stored instructions are executed, in order to determine the adjustment transmit power, the at least one processor is configured to: calculate a path loss based on the first signal and the second signal, and determine the adjustment transmit power based on the path loss.

11. The external device of claim 8, wherein, when the stored instructions are executed, the at least one processor is further configured to control the external device to receive basic transmit power information from the electronic device,
wherein, when the stored instructions are executed, in order to determine the adjustment transmit power based on the first signal and the second signal, the at least one processor is configured to determine the adjustment transmit power based on the basic transmit power information and a result of receiving the first signal,
wherein the first signal includes a trigger frame, and
wherein the second signal includes a PS-poll frame.

12. The external device of claim 8, wherein, when the stored instructions are executed, in order to receive the first signal from the electronic device within the TWT duration, the at least one processor is configured to control the external device to receive the first signal comprising communication control information from the electronic device within the TWT duration,
wherein, when the stored instructions are executed, in order to determine the adjustment transmit power based on the first signal and the second signal, the at least one processor is configured to determine the adjustment transmit power based on the communication control information and a result of receiving the first signal,
wherein the communication control information comprises at least one of an AP transmit power and an uplink target RSSI,
wherein the first signal includes a trigger frame, and
wherein the second signal includes uplink data.

13. The external device of claim 8, wherein, when the stored instructions are executed, in order to transmit the second signal to the electronic device within the TWT duration, the at least one processor is configured to control the external device to transmit the second signal comprising channel information to the electronic device, wherein the first signal includes an NDPA frame or an NDP frame, and wherein the second signal includes a CSI feedback frame.

14. A method of operating an electronic device, the method comprising:

performing wireless connection with an external device;

obtaining information of a refresh rate of the external device;

performing, based on the information of the refresh rate, a target wake time (TWT) setup comprising a TWT, a TWT duration, and a target wake interval of the external device;

transmitting a first signal to the external device within the TWT duration;

receiving a second signal from the external device within the TWT duration, the second signal comprising a TWT-related signal based on the TWT setup;

determining an adjustment transmit power based on the first signal and the second signal; and transmitting data using the adjustment transmit power.

15. The method of claim 14, wherein performing the TWT setup comprises determining the TWT duration and the target wake interval based on the information of the refresh rate.

16. The method of claim 14, wherein determining the adjustment transmit power comprises:

calculating a path loss, based on the first signal and the second signal; and determining the adjustment transmit power, based on the path loss.

17. The method of claim 14, further comprising transmitting basic transmit power information to the external device, wherein determining the adjustment transmit power based on the first signal and the second signal comprises determining the adjustment transmit power, based on the basic transmit power information and a result of receiving the second signal, wherein the first signal includes a trigger frame, and wherein the second signal includes a PS-poll frame.

18. The method of claim 14, further comprising setting communication control information, wherein transmitting the first signal to the external device within the TWT duration comprises transmitting the first signal comprising the communication control information to the external device within the TWT duration, wherein determining the adjustment transmit power based on the first signal and the second signal comprises determining the adjustment transmit power based on the second signal, wherein the communication control information comprises at least one of an AP transmit power and an uplink target RSSI, wherein the first signal includes a trigger frame, and wherein the second signal includes uplink data.

19. The method of claim 14, wherein determining the adjustment transmit power based on the first signal and the second signal comprises: acquiring channel information based on a result of receiving the second signal; and determining the adjustment transmit power based on the channel information, wherein the first signal includes an NDPA frame or an NDP frame, and wherein the second signal includes a CSI feedback frame.

20. The method of claim 19, wherein the CSI feedback frame comprises signal quality information for each stream.

* * * * *